(12) United States Patent
Hoelen et al.

(10) Patent No.: US 11,762,141 B2
(45) Date of Patent: Sep. 19, 2023

(54) LIGHT GENERATING DEVICE WITH A BEAM SHAPING OPTICAL ELEMENT

(71) Applicant: SIGNIFY HOLDING B.V., Eindhoven (NL)

(72) Inventors: Christoph Gerard August Hoelen, Valkenswaard (NL); Dirk Kornelis Gerhardus De Boer, Den Bosch (NL); Ludovicus Johannes Lambertus Haenen, Sint Oedenrode (NL); Johannes Martinus Jansen, Veldhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/802,882

(22) PCT Filed: Feb. 22, 2021

(86) PCT No.: PCT/EP2021/054320
§ 371 (c)(1),
(2) Date: Aug. 26, 2022

(87) PCT Pub. No.: WO2021/170535
PCT Pub. Date: Sep. 2, 2021

(65) Prior Publication Data
US 2023/0090913 A1 Mar. 23, 2023

(30) Foreign Application Priority Data

Feb. 27, 2020 (EP) ..................................... 20159670
Jun. 23, 2020 (EP) ..................................... 20181587

(51) Int. Cl.
*F21V 8/00* (2006.01)
*G03B 21/20* (2006.01)

(52) U.S. Cl.
CPC ......... *G02B 6/0008* (2013.01); *G02B 6/0003* (2013.01); *G03B 21/204* (2013.01); *G03B 21/208* (2013.01); *G03B 21/2013* (2013.01)

(58) Field of Classification Search
CPC ............... G02B 6/0008; G02B 6/0003; G02B 19/0066; G02B 6/0068; G02B 19/0019;
(Continued)

(56) References Cited

U.S. PATENT DOCUMENTS 9,482,937 B2 * 11/2016 Cheng ................ G03B 21/2033
9,810,826 B2 * 11/2017 Chestakov ............ F21S 41/153
(Continued)

FOREIGN PATENT DOCUMENTS

EP 3008380 A1 4/2016
WO 2006054203 A1 5/2006
(Continued)

*Primary Examiner* — Bao Q Truong

(57) ABSTRACT

A light generating system (1000) comprising a plurality of light sources (10) configured to provide light source light (11), an elongated luminescent body (100) having a first face (141) and a second face (142) defining a length (L) of the elongated luminescent body (100), the elongated luminescent body comprising one or more side faces (140), the elongated luminescent body (100) comprising a radiation input face (111) and the second face (142) comprising a first radiation exit window (112), wherein the radiation input face (111) is configured in a light receiving relationship with the plurality of light sources (10), wherein the elongated luminescent body (100) comprises luminescent material (120) configured to convert at least part of the light source light (11) into luminescent material light (8), and a beam shaping optical element (224).

15 Claims, 17 Drawing Sheets

I

II

(58) Field of Classification Search
CPC ............ G02B 27/0911; G02B 27/0983; G02B 27/0994; G03B 21/2013; G03B 21/204; G03B 21/208; F21Y 2115/10; C09K 11/7774; F21W 2131/406
See application file for complete search history.

(56) References Cited

U.S. PATENT DOCUMENTS

| | | |
|---|---|---|
| 2007/0280622 A1 | 12/2007 | Rutherford |
| 2008/0079910 A1 | 4/2008 | Rutherford et al. |
| 2016/0266297 A1 | 9/2016 | Hikmet et al. |
| 2016/0377785 A1 | 12/2016 | Chestakov et al. |
| 2017/0315433 A1* | 11/2017 | Ronda ..................... C04B 35/64 |
| 2018/0258345 A1* | 9/2018 | Peeters ................ G02B 6/4298 |

FOREIGN PATENT DOCUMENTS

| | | |
|---|---|---|
| WO | 2019008099 A1 | 1/2019 |
| WO | 2019016006 A1 | 1/2019 |

\* cited by examiner

I

II

I

II

III

LIGHT GENERATING DEVICE WITH A BEAM SHAPING OPTICAL ELEMENT

CROSS-REFERENCE TO PRIOR APPLICATIONS

This application is the U.S. National Phase application under 35 U.S.C. § 371 of International Application No. PCT/EP2021/054320, filed on Feb. 22, 2021, which claims the benefit of European Patent Application No. 20181587.5, filed on Jun. 23, 2020, and European Patent Application No. 20159670.7, filed on Feb. 27, 2020. These applications are hereby incorporated by reference herein.

FIELD OF THE INVENTION

The invention relates to a light generating system, such as for use in a projector or for use in stage lighting, or for use for microscopy or endoscopy illumination. The invention also relates to a luminaire, a lighting system or a projection system comprising such light generating system.

BACKGROUND OF THE INVENTION

Luminescent concentrators are known in the art. WO2006/054203, for instance, describes a light emitting device comprising at least one LED which emits light in the wavelength range of >220 nm to <550 nm and at least one conversion structure placed towards the at least one LED without optical contact, which converts at least partly the light from the at least one LED to light in the wavelength range of >300 nm to ≤1000 nm, wherein the at least one conversion structure has a refractive index n of >1.5 and <3 and the ratio A:E is >2:1 and <50000:1, where A and E are defined as follows: the at least one conversion structure comprises at least one entrance surface, where light emitted by the at least one LED can enter the conversion structure and at least one exit surface, where light can exit the at least one conversion structure, each of the at least one entrance surfaces having an entrance surface area, the entrance surface area(s) being numbered $A_1 \ldots A_n$ and each of the at least one exit surface(s) having an exit surface area, the exit surface area(s) being numbered $E_1 \ldots E_n$ and the sum of each of the at least one entrance surface(s) area(s) A being $A=A_1+A_2 \ldots +A_n$ and the sum of each of the at least one exit surface(s) area(s) E being $E=E_1+E_2 \ldots +E_n$.

EP3008380A discloses a light emitting device comprising a light source adapted for emitting light with a first spectral distribution, a first light guide comprising a first light input surface and a first light exit surface arranged opposite to one another, and further comprising an end surface extending perpendicular with respect to the first light input surface, and a second light guide comprising a second light input surface and a second light exit surface extending perpendicular with respect to one another. The first light guide is adapted for receiving the light, guiding the light to the first light exit surface and coupling light out of the first light exit surface into the second light guide and coupling another part of the light out of the end surface. The second light guide is adapted for receiving light coupled out of the first light guide, converting at least a part of the light, and coupling the converted light out of the second light exit surface.

US2016/266297A discloses light emitting device comprising a first and second source for emitting light with a first and a second spectral distribution, respectively, a first and second light guide comprising a first light input surface and a first light exit surface, respectively, the light input surface and the light exit surface of the respective light guides extending at an angle with respect to each other. The first and second light guide are configured to convert a part of the received light to light with a third and fourth spectral distribution, respectively, and couple at least a part of the light with the third and fourth spectral distribution out of the first and second light exit surface, respectively.

WO2019/016006A discloses lighting device comprising a plurality of sets of each one or more light sources configured to provide light source light, and plurality of luminescent elements, each luminescent element comprising an elongated luminescent body having a radiation input face for receipt of the light source light, each luminescent element comprising a luminescent material for conversion of at least part of the light source light into luminescent material light, and each luminescent element having a luminescent element exit window for the luminescent material light. The luminescent elements are configured in a configuration wherein an average distance between neighboring luminescent bodies is larger than a shortest luminescent element exit window distance between the neighboring luminescent element exit windows, thereby defining an interspace between the neighboring luminescent bodies.

US2007/280622A discloses a projection system incorporating a light guide. The light guide includes a material that is capable of emitting light of a second wavelength when illuminated with light of a first wavelength where the first wavelength is different from the second wavelength. The light guide further includes an exit face that has a first portion that is reflective at the second wavelength and a second portion that is transmissive at the second wavelength. When the light guide is illuminated with light of the first wavelength, the material converts at least a portion of the light of the first wavelength into light of the second wavelength. The majority of the light of the second wavelength that exits the second portion of the exit face is totally internally reflected by the light guide.

US2008/079910A discloses a projection system containing an illumination system having at least a first source of incoherent light capable of generating light in a first wavelength range. The illumination system also includes a body containing a fluorescent material that emits light in a second wavelength range, different from the first wavelength range, when illuminated by light in the first wavelength range. The system further includes at least a second fluorescent material that absorbs light in at least one of the first and second wavelength ranges, and emits light in a third wavelength range. The body has an extraction area, and at least some of the light in either the second or third wavelength ranges is internally reflected within the body to the extraction area. Light from the extraction area illuminates at least one image-forming device.

SUMMARY OF THE INVENTION

High brightness light sources are interesting for various applications including spots, stage-lighting, headlamps and digital light projection, and (fluorescence) microscopy and endoscopy etc.. For this purpose, it is possible to make use of so-called light concentrators where shorter wavelength light is converted to longer wavelengths in a highly transparent luminescent material. An elongated luminescent body of such a luminescent material can be illuminated by LEDs to produce longer wavelengths within the rod. Converted light which will stay in the luminescent material, such as a (trivalent cerium) doped garnet, in the waveguide mode and can then be extracted from one of the (smaller) surfaces leading to an intensity gain.

In embodiments, the light concentrator (or "luminescent concentrator") may comprise a rectangular bar, or rod, of a (transparent) phosphor material, for example a high refractive index garnet, capable to convert blue light into green or yellow light and to collect this green or yellow light in a small étendue output beam. The rectangular bar may have six surfaces, four large surfaces over the length of the bar forming the four side walls, and two smaller surfaces at the end of the bar, with one of these smaller surfaces forming the "nose" where the desired light is extracted.

Under e.g. blue light radiation, the blue light excites the phosphor, after which the phosphor start to emit green light in all directions, for example when using some cerium comprising garnet applications. Since the phosphor is embedded in—in general—a high refractive index bar, a main part of the converted (green) light is trapped into the high refractive index bar and wave guided e.g. via Total Internal Reflection (TIR) to the nose of the bar where the (green) light may leave the bar. The amount of (green) light generated is proportional to the amount of blue light pumped into the bar. The longer the bar, the more blue LEDs can be applied to pump phosphor material in the bar and the larger the number of blue LEDs to increase the brightness of the (green) light leaving at the nose of the bar that can be used. The phosphor converted light, however, can be split into two parts.

A first part consists of first types of light rays that may hit the side walls of the bar under angles larger than the critical angle of reflection. These first light rays may be trapped in the high refractive index bar and will traverse to the nose of the bar where it may leave as desired light of the system. In general, at least part of the luminescent material light may escape from the radiation exit face directly (without total internal reflection). A second part consist of second light rays ("second light rays") may hit the side walls of the bar at angles smaller than the critical angle of reflection. These second light rays are not trapped in the bar but will leave the bar at its side walls. These second light rays may be bounced back into the garnet, but in such cases these light rays will always enter the garnet under angles smaller than the total angle of reflection, will traverse straight through the garnet and leave the bar at the opposite side wall. Such, these second light rays may never channel to the nose of the bar. These second light rays are lost in principle and may limit the efficiency of such illumination systems. Typically, 44% of the converted light may be trapped and may leave the bar at its nose, while 56% of the converted light may be lost at the side walls of the bar.

A so-called high lumen density (HLD) system may comprise an elongated luminescent body, where blue light is converted to create a high intensity source for theatre lighting, beamers etc.

Relative to some prior art systems, the étendue of the elongated luminescent body for generating light may not fit the desired application, for example in case use in a liquid crystal display (LCD) system is desirable. Furthermore, it may be desirable to create a light generating system that generates light having a specific aspect ratio for application in LCD systems, for example. Furthermore, it may be desirable to create a light generating system with an optical beam shaping element that is relatively easy to manufacture.

Hence, it is an aspect of the invention to provide an alternative light generating system (or "lighting system") comprising an elongated luminescent body, which preferably further at least partly obviates one or more of above-described drawbacks and/or which may have a relatively higher efficiency. The present invention may have as object to overcome or ameliorate at least one of the disadvantages of the prior art, or to provide a useful alternative.

Hence, in an aspect the invention provides a light generating system ("system") comprising:

a plurality of light sources (10) configured to provide light source light;

an elongated luminescent body (100) having a first face and a second face defining a length of the elongated luminescent body, the elongated luminescent body comprising one or more side faces, the elongated luminescent body comprising a radiation input face and the second face comprising a first radiation exit window, wherein the radiation input face is configured in a light receiving relationship with the plurality of light sources, wherein the elongated luminescent body comprises luminescent material configured to convert at least part of the light source light into luminescent material light, wherein the second face has an angle ($\alpha$) unequal to 0° and unequal to 180° with the radiation input face, and wherein the second face has a second face surface area;

a beam shaping optical element comprising a radiation entrance window optically coupled with the first radiation exit window and configured to receive at least part of the converter light, wherein the first radiation exit window has a first radiation exit window surface area which is smaller than the second face surface area, and wherein the second face surface area that is not (directly) optically coupled to the beam shaping optical element comprises a first reflecting element, wherein the converter light comprises the luminescent material light and optionally non-converted light source light. The wording "not being (directly) optically coupled" for two elements may mean that light cannot travel from a first element to a second element without being reflected at least one time (by a surface), alternatively it may mean that the two elements are not directly (physically) coupled to each other.

It surprisingly appears that such light generating system allows to relatively easy adapt the etendue and/or the aspect ratio to fit a desired application by adapting the dimensions of the light entrance window of the beam shaping optical element. In addition, the optical efficiency of such a light generating system is relatively high. Furthermore, it may be relatively easy to manufacture such a light generating system, particularly when using a partial beam shaping optical element. For a partial beam shaping optical element, the plane of intersection may be used as the injection port during molding of the beam shaping optical element. As a result, the manufacturing process is simplified, increasing the yield and decreasing the production cost of such an element. The quality of the optical component increases, because currently the material, for example glass material, has to be pressed from the exit window of the beam shaping optical element into a relatively long and thin cavity comprising sharp edges. With injection from the side surface of the beam shaping optical element, the material is pressed into a wide and shallow cavity, enabling smaller curvature of radius at the edges of the beam shaping optical element which improves its optical performance.

In an embodiment, the first radiation exit window is asymmetrically positioned with respect to the second face. An advantage is that it is relatively easy to manufacture such a system due to a simplified positioning of the first reflective element.

In an embodiment, the elongated luminescent body has a refractive index n1, the beamshaping optical element has a refractive index n2, and wherein $0.75*n1 \leq n2 \leq 1.1*n1$. An advantage is that the extraction of the converter light from the elongated luminescent body to the beam shaping optical element is improved. In an embodiment, $0.9*n1 \leq n2 \leq 1.1*n1$.

In an embodiment, the beamshaping optical element comprises at least one of a compound parabolic concentrator, a truncated pyramid element, a truncated spherical element and a dome shaped element. These beam shaping optical elements are especially suitable to combine with an elongated luminescent body for extraction of light.

The beam shaping optical element comprises a partial beam shaping optical element configured as a beam shaping optical element intersected along a plane parallel to a plane of symmetry of the beam shaping optical element. An advantage is that plane of intersection acts as a total internal reflector for the light rays that are incident at that plane. By applying a beam shaping optical element at a part of the second face of the elongated luminescent body, and applying a reflective element at the remaining part of the second face, a relatively efficient system is obtained wherein the étendue of the system is reduced.

In an embodiment, the beam shaping optical element comprises a partial beam shaping optical element configured as a beam shaping optical element intersected along a plane coinciding with a plane of symmetry of the beam shaping optical element. An advantage is that by applying such beam shaping optical element, compared to a full beam shaping optical element that fits the elongated luminescent body, the étendue of the system is reduced by a factor of two.

In an embodiment, the second face has a first aspect ratio R1 and the radiation entrance window has a second aspect ratio R2 and wherein $R2 \leq 0.9*R1$, the aspect ratio being defined as height H/width W. An advantage is that the combination of an elongated luminescent rod with a rectangular second face and a beam shaping optical element with a square light entrance surface results in a relatively efficient system with reduction of the étendue by a factor two. An elongated luminescent body with a rectangular second and first face is advantageous because of relatively good coupling efficiency of the light source light into the body and allows to increase the flux of the light source light into the body. In an embodiment, preferably $R2 \leq 0.8*R1$, more preferably $R2 \leq 0.5*R1$ or most preferably $R2 \leq 0.25*R1$. In an embodiment, the radiation entrance window has a square shape and the second face has a rectangular shape.

In an embodiment, the partial beam shaping optical element is quarter of a compound parabolic concentrator. In an embodiment, the partial beam shaping optical element is quarter of a compound parabolic concentrator. A half or a quarter compound parabolic concentrator provides a relatively high optical efficiency in combination with reduction of the étendue. In addition, the intersection surface(s) allow a relatively easy alignment of the partial beam shaping optical element with the luminescent body and alignment of a reflecting element with the intersection surface(s) in order to reflect light back into the partial compound parabolic concentrator that would otherwise escape.

In an embodiment, wherein the partial beam shaping optical element further comprises a second reflecting element associated with the plane of intersection. The second reflecting element increases the efficiency as light that may couple out of the partial beam shaping element along the place of intersection is reflected back into the partial beam shaping optical element.

In an embodiment, the light generating system further comprising a reflector, wherein the reflector comprises the first reflecting element and the second reflecting element. An advantage is that combining the first and second reflecting element into a single reflecting element simplifies the manufacturing process.

In an embodiment, the light generating system further comprises an optical element, wherein the beam shaping optical element is optically coupled with the first radiation exit window via the optical element. As a result, the light extraction of converter light from the elongated luminescent body into the beam shaping optical element is improved, increasing the efficiency of the system.

In an embodiment, the optical element has a refractive index n3, and wherein $0.95*n2 \leq n3 \leq 1.05*n1$. As a result, the optical efficiency of the system is further improved.

In an embodiment, the ratio of the first radiation exit window surface area (A2) to the second face surface area (A1) is in the range of $0.2 \leq A2/A1 \leq 0.95$. By choosing the proper ratio of the first radiation exit window area to the second face area, the étendue can be reduced to a desired value, possibly in combination with proper further dimensions of the beam shaping optical element in order to obtain a desired aspect ratio. In an embodiment, $0.25 \leq A2/A1 \leq 0.75$.

The plurality of light sources are configured to provide light source light. At least part of the light source light is absorbed by the elongated luminescent body and converted into luminescent material light. To this end, the luminescent body comprises a radiation input face, wherein the radiation input face is configured in a light receiving relationship with the plurality of light sources. Hence, the light sources and the luminescent body are configured such that during operation at least part of the light source light enters the luminescent body and is at least partly converted thereby. Further, as indicated above the elongated luminescent body comprises luminescent material configured to convert at least part of light source light (received at the radiation input face) into luminescent material light. The luminescent material light may escape from the luminescent body. Especially, for instance by using one or more reflectors at one or more sides and/or faces of the luminescent body, the luminescent material light may especially escape from the luminescent body at essentially one face. This face, here below also indicated as second face, comprises a radiation exit window. Further, the elongated luminescent body comprising one or more side faces. The number of side faces is herein also indicated with reference N. The elongated luminescent body may especially comprise four side faces, providing a rectangular cross-section (perpendicular to an axis of elongated of the elongated body). The elongated luminescent body may in embodiments comprise a garnet type $A_3B_5O_{12}$ luminescent material comprising trivalent cerium. Embodiments of the light sources and the elongated body are also further elucidated below.

The light sources may be configured in an array. Such array may have a length in the same range as the length of the elongated body. The array may be a 1D array or a 2D array. In embodiments, the array is a 1D array, or a 2D array of sets of two light sources. In order to maximize output, the light sources may have small distances to each other. Here, especially the inter-light source distance or inter-light source distance between adjacent light source along the length of the array is meant.

The luminescent material is configured to convert at least part of light source light (received at the radiation input face) into luminescent material light. Hence, the light source(s) generate (together with the luminescent material) the luminescent material light. In embodiments, the light sources that are used to generate the luminescent material light may be solid state light sources all of the same bin. In embodiments, the light sources that are used to generate the luminescent material light all have essentially the same peak emission maximum (peak emission wavelength) (such as within 10%, especially within 5% of an average value). In embodiments, the light sources that are used to generate the luminescent material light may essentially all have the spectral power distribution and may all be configured to generate essentially the same irradiance at the radiation input face.

In specific embodiments the elongated luminescent body comprises a plurality of N side faces. In specific embodiments, $N \geq 3$. Especially, $N=4$ (such as especially a rectangular or (rectangular) square cross-section).

The elongated luminescent body may have a rectangular cross-section (perpendicular to the axis of elongation). However, other cross-sections, like triangular, or hexagonal, may also be possible. However, in general the plurality of N side faces are configured perpendicular to the first face. Further, in some embodiments the plurality of N side faces are also configured perpendicular to the second face.

One may provide a reflector at the first face (or end face) of the elongated luminescent body. Therefore, in embodiments the light generating system may further comprising a reflector configured to reflect light selected from the group of light source radiation and luminescent material radiation that has escaped from the first face back into the elongated luminescent body.

Especially, the light generating system comprises a light source configured to provide light source light. The light source is especially a solid state light source, such as an LED. The light source especially provides light source light having a peak emission maximum at or close to the excitation maximum of the luminescent material. Therefore, in embodiments wherein the luminescent material has an excitation maximum $\lambda_{xm}$, wherein the light sources are configured to provide the source light with an intensity maximum $\lambda_{px}$, wherein $\lambda_{xm}-10$ nm $\leq \lambda_{px} \leq \lambda_{xm}+10$ nm, especially wherein $\lambda_{xm}-5$ nm $\leq \lambda_{px} \leq \lambda_{xm}+5$ nm, such as wherein $\lambda_{xm}-2.5$ nm $\leq \lambda_{px} \leq \lambda_{xm}+2.5$ nm. Especially, the light source wavelength is at wavelengths with at least an (excitation) intensity of 50% of the excitation maximum (intensity), such as at least 75% of the excitation maximum (intensity), such as at least 90% of the excitation maximum (intensity) (of the excitation maximum of the luminescent material). Especially, the light source is configured with its optical axis perpendicular to the first side face, especially perpendicular the radiation input face, see also further below. Further, especially a plurality of light sources is applied. Hence, in specific embodiments the light sources have optical axes configured perpendicular to the first side face, especially perpendicular the radiation input face. Further, especially a single side face is illuminated with the light source light (when $N=4$).

As indicated above, the light generating system comprises an elongated luminescent body, having a length (L). The elongated luminescent body comprising (N) side faces over at least part of the length (L), wherein $N \geq 3$. Hence, especially the (elongated) luminescent body has a cross-sectional shape (perpendicular to an axis of elongation) that is square (N=4), rectangular (N=4), hexagonal (N=6), or octagonal (N=8), especially rectangular. Would the luminescent body have a circular cross-section, N may be considered $\infty$. The elongated luminescent body includes a first end or first face, in general configured perpendicular to one or more of the (N) side faces and a second end or second face, which may be configured perpendicular to one or more of the side faces, and thus parallel to the first face, but which also may be configured under an angle unequal to 90° and unequal to 180°. Hence, in embodiments in specific embodiments the radiation exit window has an angle unequal to 0° and unequal to 180° with one or more of the one or more side faces, especially all of the side faces. Note that the angle α may differ per for different side faces. For instance, a slanted radiation exit window of a bar shaped elongated body may have an angle of α1 with a first side face, an angle α2=180°−α1 with a second side face, and angles of 90° with the two other side faces.

The elongated luminescent body may thus in embodiments include (N) side faces, which comprise a first side face, comprising a radiation input face, and a second side face configured parallel to the first side face, wherein the side faces define a height (H). The first and the second side face are configured parallel with luminescent body material in between, thereby defining the width of the luminescent body. The radiation input face is at least part of the first face which may be configured to receive the light source light. The elongated luminescent body further comprises a radiation exit window bridging at least part of the height (H) between the first side face and the second side face. Especially, the radiation exit window is comprised by the second face. Further embodiments are also elucidated below. As indicated above, in embodiments the radiation exit window and the radiation input face have an angle (α) unequal to 0° and unequal to 180°. Yet further, as also indicated above in embodiments the radiation exit window has an angle unequal to 0° and unequal to 180° with one or more of the one or more side faces.

Yet further, the elongated luminescent body may comprise a garnet type $A_3B_5O_{12}$ luminescent material comprising trivalent cerium ($Ce^{3+}$).

In embodiments, A comprises one or more of Yttrium, Gadolinium and Lutetium, and wherein B comprises one or more of Aluminum and Gallium. In embodiments, wherein A=Lu and wherein B=Al, or wherein A comprises Y and Lu, and wherein B=Al.

The element A, as well as (further) embodiments of the garnet, are further elucidated below.

The garnet type $A_3B_5O_{12}$ luminescent material is configured to convert at least part of the light source light into converter light. Especially, the garnet material is a material that has an absorption band in the range of 400-500 nm, such as with a maximum in the range of 420-480 nm. Upon excitation with the light source light, the luminescent material generates emission, with one or more wavelengths selected from especially the range of 500-800 nm, as known in the art. Further embodiments are also elucidated below.

The beam shaping optical element may especially comprise a collimator used to convert (to "collimate") the light beam into a beam having a desired angular distribution. Further, the optical element especially comprises a elongated luminescent body comprising the radiation entrance window. Hence, the optical element may be a body of light transmissive material that is configured to collimate the converter radiation from the luminescent body.

In specific embodiments, the optical element comprises a compound parabolic like collimator, such as a CPC (compound parabolic concentrator).

A massive collimator, such as a massive CPC, may especially be used as extractor of light and to collimate the (emission) radiation. Alternatively, one may also comprise a dome with optical contact (refractive index n>1) on the nose of the rod or a hollow collimator, such as a CPC, to concentrate the (emission) radiation. The dimension of the optical element may vary over its length, as it may have a beam shaping function.

Further, the shape of the cross-section of the optical element may vary with position along the optical axis. In a specific configuration, the aspect ratio of a rectangular cross-section may change, preferably monotonically, with position along the optical axis. In another preferred configuration, the shape of the cross-section of the optical element may change from round to rectangular, or vice versa, with position along the optical axis.

As indicated above, the radiation exit window of the elongated luminescent body is in optical contact with the radiation entrance window of the optical element. The term "optical contact" and similar terms, such as "optically coupled" especially mean that the light (especially luminescent material light) escaping the radiation exit window surface area (A1) may enter the optical element radiation entrance window with minimal losses (such as Fresnel reflection losses or TIR (total internal reflection) losses) due to refractive index differences of these elements. The losses may be minimized by one or more of the following elements: a direct optical contact between the two optical elements, providing an optical glue between the two optical elements, preferably the optical glue having a refractive index higher that the lowest refractive index of the two individual optical elements, providing the two optical elements in close vicinity (e.g. at a distance much smaller than the wavelength of the light), such that the light will tunnel through the material present between the two optical elements, providing an optically transparent interface material between the two optical elements, preferably the optically transparent interface material having a refractive index higher that the lowest refractive index of the two individual optical elements, the optically transparent interface material might be a liquid or a gel or providing optical anti reflection coatings on the surfaces of (one or both of) the two individual optical elements. In embodiments, the optically transparent interface material may also be a solid material. Further, the optical interface material or glue especially may have a refractive index not higher than the highest refractive index of the two individual optical elements.

Instead of the term "in optical contact" also the terms "radiationally coupled" or "radiatively coupled" may be used. The term "radiationally coupled" especially means that the elongated luminescent body and the optical element are associated with each other so that at least part of the radiation emitted by the luminescent body is received by the luminescent material. The luminescent body and the beam shaping optical element, especially the indicated "windows" may in embodiments be in physical contact with each other or may in other embodiments be separated from each other with a (thin) layer of optical glue, e.g. having a thickness of less than about 1 mm, preferably less than 100 µm. When no optically transparent interface material is applied, the distance between two elements being in optical contact may especially be about at maximum the wavelength of relevance, such as the wavelength of an emission maximum. For visible wavelengths, this may be less than 1 µm, such as less than 0.7 µm, and for blue even smaller.

Likewise, the light sources are radiationally coupled with the luminescent body, though in general the light sources are not in physical contact with the luminescent body (see also below). As the luminescent body is a body and as in general also the optical element is a body, the term "window" herein may especially refer to side or a part of a side.

Hence, the luminescent body comprises one or more side faces, wherein the optical element is configured to receive at the radiation entrance window at least part of the converter radiation that escapes from the one or more side faces.

This radiation may reach the entrance window via a gas, such as air directly. Also the radiation may be delivered via another interface material such as a liquid or transparent solid interface material. Additionally or alternatively, this radiation may reach the entrance window after one or more reflections, such as reflections at a mirror positioned nearby the luminescent body. Hence, in embodiments the light generating system may further comprise a first reflective surface, especially configured parallel to one or more side faces, and configured at a first distance from the luminescent body, wherein the first reflective surface is configured to reflect at least part of the converter radiation that escapes from the one or more side faces back into the luminescent body or to the optical element. The space between the reflective surface and the one or more side faces may comprise a gas, wherein the gas comprises air. The first distance may e.g. be in the range of 0.1 µm-20 mm, such as in the range of 1 µm-10 mm, like 2-10 mm.

Especially, the distance is at least equal to the wavelength of interest, more especially at least twice the wavelength of interest. Further, as there may be some contact, e.g. for holding purposes or for distance holder purposes, especially an average distance is at least $\lambda_i$, such as at least $1.5*\lambda_i$, like at least $2*\lambda_i$, such as especially about $5*\lambda_i$, wherein $\lambda_i$ is the wavelength of interest. Especially, however, the average distance is in embodiments not larger than 50 µm, such as not larger than 25 µm, like not larger than 20 µm, like not larger than 10 µm, for purposes of good thermal contact. Likewise, such average minimum distance may apply to a reflector and/or optical filter configured at e.g. an end face, or other optical components as well. Optionally, in embodiments an element may comprise both heat sinking function a reflection function, such as a heat sink with a reflective surface, or a reflector functionally coupled to a heat sink.

The light generating system may be configured to provide blue, green, yellow, orange, or red light, etc.. Alternatively or additionally, in embodiments, the light generating system may (also) be configured to provide one or more of UV, such as near UV (especially in the range of 320-400 nm), and IR, such as near IR (especially in the range of 750-3000 nm). Further, in specific embodiment, the light generating system may be configured to provide white light. If desired, monochromaticity may be improved using optical filter(s). The definitions of near UV and near infrared may partly overlap with the generally used definition for visible light, which is 380-780 nm.

The term "light concentrator" or "luminescent concentrator" is herein used, as one or more light sources irradiate a relatively large surface (area) of the light converter, and a lot of converter radiation may escape from a relatively small area (radiation exit window) of the light converter. Thereby, the specific configuration of the light converter provides its light concentrator properties. Especially, the light concentrator may provide Stokes-shifted light, which is Stokes shifted relative to the pump radiation. Hence, the term "luminescent concentrator" or "luminescent element" may refer to the same element, especially an elongated luminescent body comprising a luminescent material, wherein the term "concentrator" and similar terms may refer to the use in combination with one or more light sources and the term "element" may be used in combination with one or more, including a plurality, of light sources. When using a single light source, such light source may e.g. be a laser, especially a solid state laser (like a LED laser). The elongated luminescent body comprises a luminescent material and can herein especially be used as luminescent concentrator. The elongated luminescent body is herein also indicated as "luminescent body". Especially, a plurality of light sources may be applied.

The terms "upstream" and "downstream" relate to an arrangement of items or features relative to the propagation of the light from a light generating means (here the especially the light source(s)), wherein relative to a first position within a beam of light from the light generating means, a second position in the beam of light closer to the light generating means is "upstream", and a third position within the beam of light further away from the light generating means is "downstream".

The elongated luminescent body has light guiding or wave guiding properties. Hence, the elongated luminescent body is herein also indicated as waveguide or light guide. As the elongated luminescent body is used as light concentrator, the elongated luminescent body is herein also indicated as light concentrator. The elongated luminescent body will in general have (some) transmission of one or more of (N)UV, visible and (N)IR radiation, such as in embodiments at least visible light, in a direction perpendicular to the length of the elongated luminescent body. Without the activator (dopant) such as trivalent cerium, the internal transmission in the visible might be close to 100%.

The transmission of the elongated luminescent body for one or more luminescence wavelengths may be at least 80%/cm, such as at least 90%/cm, even more especially at least 95%/cm, such as at least 98%/cm, such as at least 99%/cm. This implies that e.g. a 1 cm$^3$ cubic shaped piece of elongated luminescent body, under perpendicular irradiation of radiation having a selected luminescence wavelength (such as a wavelength corresponding to an emission maximum of the luminescence of the luminescent material of the elongated luminescent body), will have a transmission of at least 95%. Hence, the elongated luminescent body is herein also indicated as "light transmissive body", as this body is light transmissive for the luminescent material light.

Herein, values for transmission especially refer to transmission without taking into account Fresnel losses at interfaces (with e.g. air). Hence, the term "transmission" especially refers to the internal transmission. The internal transmission may e.g. be determined by measuring the transmission of two or more bodies having a different width over which the transmission is measured. Then, based on such measurements the contribution of Fresnel reflection losses and (consequently) the internal transmission can be determined. Hence, especially, the values for transmission indicated herein, disregard Fresnel losses.

In embodiments, an anti-reflection coating may be applied to the luminescent body, such as to suppress Fresnel reflection losses (during the light incoupling process).

In addition to a high transmission for the wavelength(s) of interest, also the scattering for the wavelength(s) may especially be low. Hence, the mean free path for the wavelength of interest only taking into account scattering effects (thus not taking into account possible absorption (which should be low anyhow in view of the high transmission), may be at least 0.5 times the length of the body, such as at least the length of the body, like at least twice the length of the body. For instance, in embodiments the mean free path only taking into account scattering effects may be at least 5 mm, such as at least 10 mm. The wavelength of interest may especially be the wavelength at maximum emission of the luminescence of the luminescent material. The term "mean free path" is especially the average distance a ray will travel before experiencing a scattering event that will change its propagation direction.

The terms "light" and "radiation" are herein interchangeably used, unless clear from the context that the term "light" only refers to visible light. The terms "light" and "radiation" may thus refer to UV radiation, visible light, and IR radiation. In specific embodiments, especially for lighting applications, the terms "light" and "radiation" refer to visible light.

The term UV radiation may in specific embodiments refer to near UV radiation (NUV). Therefore, herein also the term "(N)UV" is applied, to refer to in general UV, and in specific embodiments to NUV. The term IR radiation may in specific embodiments refer to near IR radiation (NIR). Therefore, herein also the term "(N)IR" is applied, to refer to in general IR, and in specific embodiments to NIR.

Herein, the term "visible light" especially relates to light having a wavelength selected from the range of 380-780 nm. The transmission can be determined by providing light at a specific wavelength with a first intensity to the elongated luminescent body under perpendicular radiation and relating the intensity of the light at that wavelength measured after transmission through the material, to the first intensity of the light provided at that specific wavelength to the material (see also E-208 and E-406 of the CRC Handbook of Chemistry and Physics, 69th edition, 1088-1989).

The elongated luminescent body may have any shape, such as beam (or bar) like or rod like, however especially beam like (cuboid like). The elongated luminescent body might be hollow, like a tube, or might be filled with another material, like a tube filled with water or a tube filled with another solid light transmissive medium. The invention is not limited to specific embodiments of shapes, neither is the invention limited to embodiments with a single exit window or outcoupling face. Below, some specific embodiments are described in more detail. Would the elongated luminescent body have a circular cross-section, then the width and height may be equal (and may be defined as diameter). Especially, however, elongated luminescent body has a cuboid like shape, such as a bar like shape, and is further configured to provide a single exit window.

The elongated luminescent body typically has an aspect ratio larger than 1, i.e. the length is larger than the width and/or the height. In general, the elongated luminescent body is a rod, or bar (beam), or a rectangular plate, though the elongated luminescent body does not necessarily have a square, rectangular or round cross-section. In general, the light source is configured to irradiate one (or more) of the longer faces (side edge), herein indicated as radiation input face, and radiation escapes from a face at a front (front edge), herein indicated as radiation exit window. The light source(s) may provide radiation to one or more side faces, and optionally an end face. Hence, there may be more than one radiation input face. The radiation exit window may especially have an angle unequal to 0° and unequal to 180° with the radiation input face, such as angle(s) of 90°.

Especially, in embodiments the solid state light source, or other light source, is not in (direct) physical contact with the elongated luminescent body.

Physical contact (between the light exit window(s) of the light source(s) and the light entrance window(s) of the elongated luminescent body/bodies) may lead to undesired outcoupling (from the elongated luminescent body) and thus a reduction in concentrator efficiency. Hence, especially there is substantially no physical contact. If the actual contact area is kept small enough, the optical impact may be negligible or at least acceptable. Therefore, it may be perfectly acceptable to have some physical contact, e.g. by some small points as resulting from a certain surface roughness, or non-perfectly flat surface, or by some intentionally created "highest spots" on a surface that will define a certain average distance between the two surfaces that don't extract substantial amounts of light while enabling a short average distance.

Further, in general the elongated luminescent body comprises two substantially parallel faces, a radiation input face and opposite thereof the opposite face. These two faces define herein the width of the elongated luminescent body. In general, the length of these faces defines the length of the luminescent body. However, as indicated above, and also below, the luminescent body may have any shape, and may also include combinations of shapes. Especially, the radiation input face has an radiation input face area (A), wherein the radiation exit window has a radiation exit window area (E), and wherein the radiation input face area (A) is at least 1.5 times, even more especially at least two times larger than the radiation exit window area (E), especially at least 5 times larger, such as in the range of 2-50,000, especially 5-5,000 times larger. Hence, especially the elongated luminescent body comprises a geometrical concentration factor, defined as the ratio of the area of the radiation input faces and the area of the radiation exit window, of at least 1.5, such as at least 2, like at least 5, or much larger (see above). This allows e.g. the use of a plurality of solid state light sources (see also below). For typical applications like in automotive, digital projectors, or high brightness spotlight applications, a small but high radiant flux or luminous flux emissive surface is desired. This cannot be obtained with a single LED, but can be obtained with the present light generating system. Especially, the radiation exit window has a radiation exit window area (E) selected from the range of 1-100 mm$^2$. With such dimensions, the emissive surface can be small, whereas nevertheless high radiance or luminance may be achieved. As indicated above, the elongated luminescent body in general has an aspect ratio (of length/width). This allows a small radiation exit surface, but a large radiation input surface, e.g. irradiated with a plurality of solid-state light sources.

The length of the elongated luminescent body is typically larger than the cross-sectional diameter or of the equivalent circular cross-sectional diameter. Here, "cross-sectional" refers to a cross-section perpendicular to the axis or length of elongation of the elongated luminescent body. The equivalent circular diameter (or ECD) of an (irregularly shaped) two-dimensional shape (such as a cross-section) is the diameter of a circle of equivalent area. For instance, the equivalent circular diameter of a square with side a is $2*a*SQRT(1/\pi)$.

In a specific embodiment, the elongated luminescent body has a height (H) selected from the range of 0.5-100 mm, such as 0.5-10 mm. However, smaller heights may also be possible, such as about 100-500 µm, like at least 140 µm. The elongated luminescent body is thus especially an integral body, having the herein indicated faces.

The generally rod shaped or bar shaped elongated luminescent body can have any cross-sectional shape, but in embodiments has a cross section the shape of a square, rectangle, round, oval, triangle, pentagon, or hexagon. Generally, the ceramic or crystal bodies are cuboid. In specific embodiments, the body may be provided with a different shape than a cuboid, with the light input surface having somewhat the shape of a trapezoid. By doing so, the light flux may be even enhanced, which may be advantageous for some applications. Hence, in some instances (see also above) the term "width" may also refer to diameter, such as in the case of a elongated luminescent body having a round cross section. Hence, in embodiments the elongated luminescent body further has a length (L), a width (W) and a height (H), with especially L>W and L>H. Especially, the first face and the second face define the length, i.e. the distance between these faces is the length of the elongated luminescent body. These faces may especially be arranged parallel. Further, in a specific embodiment the length (L) is at least 2 cm, like 3-20 cm, such as 4-20 cm, such as at maximum 15 cm. Other dimensions may, however, also be possible, such as e.g. 0.5-2 cm.

Especially, the elongated luminescent body has a height (H) selected to absorb more than 95% of the light source light. In embodiments, the elongated luminescent body has a height (H) selected from the range of 0.03-4 cm, especially 0.05-2 cm, such as 0.1-1.5 cm, like 0.1-1 cm. With the herein indicated cerium concentration, such width is enough to absorb substantially all light (especially at the excitation wavelength with maximum excitation intensity) generated by the light sources.

The elongated luminescent body may also be a cylindrically shaped rod. In embodiments the cylindrically shaped rod has one flattened surface along the longitudinal direction of the rod and at which the light sources may be positioned for efficient incoupling of light emitted by the light sources into the elongated luminescent body. The flattened surface may also be used for placing heatsinks. The cylindrical elongated luminescent body may also have two flattened surfaces, for example located opposite to each other or positioned perpendicular to each other. In embodiments the flattened surface extends along a part of the longitudinal direction of the cylindrical rod. Especially however, the edges are planar and configured perpendicular to each other.

The side face is especially such flattened surface(s). The flattened surface especially has a relatively low surface roughness, such as an Ra of at maximum 100 nm, such as in the range of 5-100 nm, like up to 50 nm.

The elongated luminescent body may also comprise a tube or a plurality of tubes. In embodiments, the tube (or tubes) may be filled with a gas, like air or another gas having higher heat conductivity, such as helium or hydrogen, or a gas comprising two or more of helium, hydrogen, nitrogen, oxygen and carbon dioxide. In embodiments, the tube (or tubes) may be filled with a liquid, such as water or (another) cooling liquid.

The elongated luminescent body as set forth below in embodiments according to the invention may also be folded, bended and/or shaped in the length direction such that the elongated luminescent body is not a straight, linear bar or rod, but may comprise, for example, a rounded corner in the form of a 90 or 180 degrees bend, a U-shape, a circular or elliptical shape, a loop or a 3-dimensional spiral shape having multiple loops. This provides for a compact elongated luminescent body of which the total length, along which generally the light is guided, is relatively large, leading to a relatively high lumen output, but can at the same time be arranged into a relatively small space. For example, luminescent parts of the elongated luminescent body may be rigid while transparent parts of the elongated luminescent body are flexible to provide for the shaping of the elongated luminescent body along its length direction. The light sources may be placed anywhere along the length of the folded, bended and/or shaped elongated luminescent body.

Parts of the elongated luminescent body that are not used as light incoupling area or light exit window may be provided with a reflector. Hence, in an embodiment the light generating system further comprises a reflector configured to reflect luminescent material radiation back into the elongated luminescent body. Therefore, the light generating system may further include one or more reflectors, especially configured to reflect radiation back into the elongated luminescent body that escapes from one or more other faces than the radiation exit window. Especially, a face opposite of the radiation exit window may include such reflector, though in an embodiment not in physical contact therewith. Hence, the reflectors may especially not be in physical contact with the elongated luminescent body. Therefore, in an embodiment the light generating system further comprises an optical reflector (at least) configured downstream of the first face and configured to reflect light back into the elongated luminescent body. Alternatively, or additionally, optical reflectors may also be arranged at other faces and/or parts of faces that are not used to couple light source light in or luminescence light out. Especially, such optical reflectors may not be in physical contact with the elongated luminescent body. Further, such optical reflector(s) may be configured to reflect one or more of the luminescence and light source light back into the elongated luminescent body. Hence, substantially all light source light may be reserved for conversion by the luminescent material (i.e. the activator element(s) such as especially $Ce^{3+}$) and a substantial part of the luminescence may be reserved for outcoupling from the radiation exit window. The term "reflector" may also refer to a plurality of reflectors.

The one or more reflectors may consist of a metal reflector, such as a thin metal plate or a reflective metal layer deposited on a substrate, such as e.g. glass. The one or more reflectors may consist of an optical transparent body containing optical structure to reflect (part) of the light such as prismatic structures. The one or more reflectors may consist of specular reflectors. The one or more reflectors may contain microstructures, such as prism structures or saw tooth structures, designed to reflect the light rays towards a desired direction.

The terms "coupling in" and similar terms and "coupling out" and similar terms indicate that light changes from medium (external from the elongated luminescent body into the elongated luminescent body, and vice versa, respectively). In general, the light exit window will be a face (or a part of a face), configured (substantially) perpendicular to one or more other faces of the waveguide. In general, the elongated luminescent body will include one or more body axes (such as a length axis, a width axis or a height axis), with the exit window being configured (substantially) perpendicular to such axis. Hence, in general, the light input face(s) will be configured (substantially) perpendicular to the light exit window. Thus, the radiation exit window is especially configured perpendicular to the one or more radiation input faces. Therefore, especially the face comprising the light exit window does not comprise a light input face.

For further improving efficiency and/or for improving the spectral distribution several optical elements may be included like mirrors, optical filters, additional optics, etc.

In specific embodiments, the light generating system may have a mirror configured at the first face configured to reflect light back into the elongated luminescent body, and/or may have one or more of an optical filter, a (wavelength selective) mirror, a reflective polarizer, light extraction structures, and a collimator configured at the second face. Especially, in embodiments these optical elements may be configured at a distance of about 0.01-1 mm, such as 0.1-1 mm from the body. This may especially apply for e.g. mirrors, wherein optical coupling is not desired.

In embodiments, when no optically transparent interface material is applied between the elongated luminescent body and the beam shaping optical element, the average distance between the two elements being in optical contact may especially be about at maximum the wavelength of relevance, such as the wavelength of an emission maximum. Hence, when optical contact is desired, there may be physical contact. Even in such embodiments, there may be a non-zero average distance, but then equal to or lower than the wavelength of interest.

In specific embodiments, especially when no optical contact is desired, the average distance may be as indicated above but at a few places, for instance for configuration purposes, there may be physical contact. For instance, there may be contact with the edge faces over less than 10%, such as over less than 5% of the total area of the side faces. Hence, the minimum average distance may be as defined e.g. above and if there is physical contact, this physical contact may be with at maximum 10% of the surface area of the surface with which the element (mirror and/or heat sink) is in physical contact, such as at maximum 5%, like at maximum 2%, even more especially at maximum 1%. For instance, for the side faces an average distance may e.g. be between 2 and 10 µm (the lower limit basically determined as being a few times the wavelength of interest; here, assuming e.g. visible light). This may be achieved by having physical contact (to secure that distance) over less than 1% of the total area of that respective side face.

For instance, a heat sink or a reflector, or the relevant surface may have some protrusions, like a surface roughness, by which there may be contact between the surface and the element, but in average the distance is at least $\lambda_i$ (or more, see also above, in order to essentially prevent optical contact), but there is physical contact with equal to or less than 10% of the surface of the body (to which the element may be thermally coupled and/or optically not coupled), especially substantially less.

As indicated above, the light generating system may comprise a plurality of light sources. These pluralities of light sources may be configured to provide light source light to a single side or face or to a plurality of faces; see further also below. When providing light to a plurality of faces, in general each face will receive light of a plurality of light sources (a subset of the plurality of light sources). Hence, in embodiments a plurality of light sources will be configured to provide light source light to a radiation input face. Also, this plurality of light sources will in general be configured in a row or a plurality of rows. Hence, the elongated luminescent body is elongated, the plurality of light sources may be configured in a row, which may be substantially parallel to the axis of elongated of the elongated luminescent body. The row of light sources may have substantially the same length as the elongated luminescent body.

The light sources may be configured to provide light with a wavelength selected from the range of UV (including near UV), visible, and infrared (including near IR).

Especially, the light sources are light sources that during operation emit (light source light) at least light at a wavelength selected from the range of 200-490 nm, especially light sources that during operation emit at least light at wavelength selected from the range of 360-490 nm, such as 400-490 nm, even more especially in the range of 430-490 nm, such as 440-490 nm, such as at maximum 480 nm. This light may partially be used by the luminescent material. Hence, in a specific embodiment, the light source is configured to generate blue light. In a specific embodiment, the light source comprises a solid state light source (such as a LED or laser diode). The term "light source" may also relate to a plurality of light sources, such as e.g. 2-2000, such as 2-500, like 2-100, e.g. at least 4 light sources, such as in embodiments especially 4-80 (solid state) light sources, though many more light sources may be applied. The term "light source" may also relate to one or more light sources that are tailored to be applied for such light concentrating luminescent concentrators, e.g. one or more LEDs having a long elongated radiating surface matching the long elongated light input surfaces of the elongated luminescent concentrator. Hence, the term LED may also refer to a plurality of LEDs. Hence, as indicated herein, the term "solid state light source" may also refer to a plurality of solid state light sources. In an embodiment (see also below), these are substantially identical solid state light sources, i.e. providing substantially identical spectral distributions of the solid state light source radiation. In embodiments, the solid state light sources may be configured to irradiate different faces of the elongated luminescent body. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB ("printed circuit board") or comparable. Hence, a plurality of semiconductor light sources may be configured on the same substrate. In embodiments, a COB is a multi LED chip configured together as a single lighting module.

In an embodiment, the light generating system comprises a plurality of light sources. Especially, the light source light of the plurality of light sources have spectral overlap, even more especially, they are of the same type and provide substantial identical light (having thus substantial the same spectral distribution). Hence, the light sources may substantially have the same emission maximum ("peak emission maximum"), such as within a bandwidth of 10 nm, especially within 8 nm, such as within 5 nm (e.g. obtained by binning). However, in yet other embodiments, the light generating system may comprise a single light source, especially a solid-state light source having a relatively large die. Hence, herein also the phrase "one or more light sources" may be applied.

In embodiments, there may be two or more different luminescent materials, such as e.g. when applying two or more different light transmissive bodies. In such embodiments, the light sources may comprise light sources with two or more different emission spectra enabling excitation of two different luminescent materials. Such two or more different light sources may belong to different bins.

The light sources are especially configured to provide a blue optical power ($W_{opt}$) of at least 0.2 Watt/mm$^2$ to the elongated luminescent body, i.e. to the radiation input face(s). The blue optical power is defined as the energy that is within the energy range that is defined as blue part of the spectrum (see also below). Especially, the photon flux is in average at least $4.5*10^{17}$ photons/(s·mm$^2$), such as at least $6.0*10^{17}$ photons/(s·mm$^2$). Assuming blue (excitation) light, this may e.g. correspond to a blue power ($W_{opt}$) provided to at least one of the radiation input faces of in average at least 0.067 Watt/mm$^2$ and 0.2 Watt/mm$^2$, respectively. Here, the term "in average" especially indicates an average over the area (of the at least one of the radiation input surfaces). When more than one radiation input surface is irradiated, then especially each of these radiation input surfaces receives such photon flux. Further, especially the indicated photon flux (or blue power when blue light source light is applied) is also an average over time.

In yet a further embodiment, especially for (DLP (digital light processing)) projector applications, the plurality of light sources are operated in pulsed operation with a duty cycle selected from the range of 10-80%, such as 25-70%.

The light generating system may comprise a plurality of luminescent concentrators, such as in the range of 2-50, like 2-20 light concentrators (which may e.g. be stacked).

The phrase "configured to provide luminescent material radiation at the radiation exit window" and similar phrases especially refers to embodiments wherein the luminescent material radiation is generated within the luminescent concentrator (i.e. within the elongated luminescent body), and part of the luminescent material radiation will reach the radiation exit window and escape from the luminescent concentrator. Hence, downstream of the radiation exit window the luminescent material radiation is provided. The converter radiation, downstream of the radiation exit window comprises at least the luminescent material radiation escaped via the radiation exit window from the light converter. Instead of the term "converter radiation" also the term "light concentrator light" may be used. Pump radiation can be applied to a single radiation input face or a plurality of radiation input faces.

In embodiments, the length (L) is selected from the range of 1-100 cm, such as especially 2-50 cm, like at least 3 cm, such as 5-50 cm, like at maximum 30 cm. This may thus apply to all luminescent concentrators. However, the range indicates that the different luminescent concentrators may have different lengths within this range.

In yet further embodiments, the elongated luminescent body (of the luminescent concentrator) comprises an elongated ceramic body. For instance, luminescent ceramic garnets doped with Ce$^{3+}$ (trivalent cerium) can be used to convert blue light into light with a longer wavelength, e.g. within the green to red wavelength region, such as in the range of about 500-750 nm, or even in the cyan. To obtain sufficient absorption and light output in desired directions, it is advantageous to use transparent rods (especially substantially shaped as beams). Such rod can be used as light concentrator, converting light source light into converter radiation and providing at an exit surface (a substantial amount of) (concentrated) converter radiation. Light generating systems based on light concentrators may e.g. be of interest for projector applications. For projectors, red, yellow, green and blue luminescent concentrators are of interest. Green and/or yellow luminescent rods, based on garnets, can be relatively efficient. Such concentrators are especially based on YAG:Ce (i.e. $Y_3Al_5O_{12}$:Ce$^{3+}$) or LuAG, which can be indicated as $(Y_{1-x}Lu_x)_3Al_5O_{12}$:Ce$^{3+}$, where $0 \leq x \leq 1$, such as in embodiments $Lu_3Al_5O_{12}$:Ce$^{3+}$. 'Red' garnets can be made by doping a YAG-garnet with Gd ("YGdAG"). Cyan emitters can be made by e.g. replacing (part of the) Al (in e.g. LuAG) by Ga (to provide "LuGaAG"). Blue luminescent concentrators can be based on YSO ($Y_2SiO_5$:Ce$^{3+}$) or similar compounds or BAM ($BaMgAl_{10}O_{17}$:Eu$^{2+}$) or similar compounds, especially configured as single crystal(s). The term similar compounds especially refer to compounds having the same crystallographic structure but where one or more cations are at least partially replaced with another cation (e.g. Y replacing with Lu and/or Gd, or Ba replacing with Sr). Optionally, also anions may be at least partially replaced, or cation-anion combinations, such as replacing at least part of the Al—O with Si—N.

Hence, especially the elongated luminescent body comprises a ceramic material configured to wavelength convert at least part of the (blue) light source light into converter radiation in e.g. one or more of the green, yellow and red, which converter radiation at least partly escapes from the radiation exit window.

In embodiments, the ceramic material especially comprises an $A_3B_5O_{12}:Ce^{3+}$ ceramic material ("ceramic garnet"), wherein A comprises yttrium (Y) and/or lutetium (Lu) and/or gadolinium (Gd), and wherein B comprises aluminum (Al) and/or gallium (Ga), especially at least Al. As further indicated below, A may also refer to other rare earth elements and B may include Al only, but may optionally also include gallium. The formula $A_3B_5O_{12}:Ce^{3+}$ especially indicates the chemical formula, i.e. the stoichiometry of the different type of elements A, B and O (3:5:12). However, as known in the art the compounds indicated by such formula may optionally also include a small deviation from stoichiometry.

As indicated above, in embodiments the ceramic material comprises a garnet material. However, also other (crystallographic) cubic systems may be applied. Hence, the elongated body especially comprises a luminescent ceramic. The garnet material, especially the ceramic garnet material, is herein also indicated as "luminescent material". The luminescent material comprises an $A_3B_5O_{12}:Ce^{3+}$ (garnet material), wherein A is especially selected from the group consisting of Sc, Y, Tb, Gd, and Lu (especially at least Y and/or Lu, and optionally Gd), wherein B is especially selected from the group consisting of Al and Ga (especially at least Al). More especially, A (essentially) comprises (i) lutetium (Lu), (ii) yttrium, (iii) yttrium (Y) and lutetium (Lu), (iv) gadolinium (Gd), optionally in combination with one of the aforementioned, and B comprises aluminum (Al) or gallium (Ga) or a combination of both. Such garnet is be doped with cerium (Ce), and optionally with other luminescent species such as praseodymium (Pr).

As indicated above, the element A may especially be selected from the group consisting of yttrium (Y) and gadolinium (Gd). Hence, $A_3B_5O_{12}:Ce^{3+}$ especially refers to $(Y_{1-x}Gd_x)_3B_5O_{12}:Ce^{3+}$, wherein especially x is in the range of 0.1-0.5, even more especially in the range of 0.2-0.4, yet even more especially 0.2-0.35. Hence, A may comprise in the range of 50-90 atom % Y, even more especially at least 60-80 atom % Y, yet even more especially 65-80 atom % of A comprises Y. Further, A comprises thus especially at least 10 atom % Gd, such as in the range of 10-50 atom % Gd, like 20-40 atom %, yet even more especially 20-35 atom % Gd.

Especially, B comprises aluminum (Al), however, B may also partly comprise gallium (Ga) and/or scandium (Sc) and/or indium (In), especially up to about 20% of Al, more especially up to about 10% of Al may be replaced (i.e. the A ions essentially consist of 90 or more mole % of Al and 10 or less mole % of one or more of Ga, Sc and In); B may especially comprise up to about 10% gallium. Therefore, B may comprise at least 90 atom % Al. Hence, $A_3B_5O_{12}:Ce^{3+}$ especially refers to $(Y_{1-x}Gd_x)_3A_3B_5O_{12}:Ce^{3+}$, wherein especially x is in the range of 0.1-0.5, even more especially in the range of 0.2-0.4.

In another variant, B (especially Al) and O may at least partly be replaced by Si and N. Optionally, up to about 20% of Al—O may be replaced by Si—N, such as up to 10%.

For the concentration of cerium, the indication n mole % Ce indicates that n % of A is replaced by cerium. Hence, $A_3B_5O_{12}:Ce^{3+}$ may also be defined as $(A_{1-n}Ce_n)_3B_5O_{12}$, with n being in the range of 0.001-0.036, such as 0.0015-0.01. Therefore, a garnet essentially comprising Y and mole Ce may in fact refer to $((Y_{1-x}Gd_x)_{1-n}Ce_n)_3B_5O_{12}$, with x and n as defined above.

Especially, the ceramic material is obtainable by a sintering process and/or a hot-pressing process, optionally followed by an annealing in an (slightly) oxidizing atmosphere. The term "ceramic" especially relates to an inorganic material that is—amongst others—obtainable by heating a (poly crystalline) powder at a temperature of at least 500° C., especially at least 800° C., such as at least 1000° C., like at least 1400° C., under reduced pressure, atmospheric pressure or high pressure, such as in the range of $10^{-8}$ to 500 MPa, such as especially at least 0.5 MPa, like especially at least 1 MPa, like 1 to about 500 MPa, such as at least 5 MPa, or at least 10 MPa, especially under uniaxial or isostatic pressure, especially under isostatic pressure. A specific method to obtain a ceramic is hot isostatic pressing (HIP), whereas the HIP process may be a post-sinter HIP, capsule HIP or combined sinter-HIP process, like under the temperature and pressure conditions as indicate above. The ceramic obtainable by such method may be used as such, or may be further processed (like polishing). A ceramic especially has density that is at least 90% (or higher, see below), such as at least 95%, like in the range of 97-100%, of the theoretical density (i.e. the density of a single crystal). A ceramic may still be polycrystalline, but with a reduced, or strongly reduced volume between grains (pressed particles or pressed agglomerate particles). The heating under elevated pressure, such as HIP, may e.g. be performed in an inert gas, such as comprising one or more of $N_2$ and argon (Ar). Especially, the heating under elevated pressures is preceded by a sintering process at a temperature selected from the range of 1400-1900° C., such as 1500-1800° C. Such sintering may be performed under reduced pressure, such as at a pressure of $10^{-2}$ Pa or lower. Such sintering may already lead to a density of in the order of at least 95%, even more especially at least 99%, of the theoretical density. After both the pre-sintering and the heating, especially under elevated pressure, such as HIP, the density of the elongated luminescent body can be close to the density of a single crystal. However, a difference is that grain boundaries are available in the elongated luminescent body, as the elongated luminescent body is polycrystalline. Such grain boundaries can e.g. be detected by optical microscopy or SEM. Hence, herein the elongated luminescent body especially refers to a sintered polycrystalline having a density substantially identical to a single crystal (of the same material). Such body may thus be highly transparent for visible light (except for the absorption by the light absorbing species such as especially $Ce^{3+}$).

The luminescent concentrator may also be a crystal, such as a single crystal. Such crystals can be grown/drawn from the melt in a higher temperature process. The large crystal, typically referred to as boule, can be cut into pieces to form the light transmissive bodies. The polycrystalline garnets mentioned above are examples of materials that can alternatively also be grown in single crystalline form.

After obtaining the elongated luminescent body, the body may be polished. Before or after polishing an annealing process (in an oxidative atmosphere) may be executed, especially before polishing. In a further specific embodiment, the annealing process lasts for at least 2 hours, such as at least 2 hours at least 1200° C. Further, especially the oxidizing atmosphere comprises for example $O_2$.

In specific embodiments, the luminescent concentrator may also be another material with light conversion properties such as e.g. quantum dots in glass, nanophosphors in transparent media etc.

The light generating system may further comprise a cooling element in thermal contact with the luminescent concentrator. The cooling element can be a heatsink or an actively cooled element, such as a Peltier element. Further, the cooling element can be in thermal contact with the elongated luminescent body via other means, including heat transfer via air or with an intermediate element that can transfer heat, such as a thermal grease. Especially, however, the cooling element is in physical contact with the elongated luminescent body. The term "cooling element" may also refer to a plurality of identical or different cooling elements.

Hence, the light generating system may include a heatsink configured to facilitate cooling of the solid state light source and/or luminescent concentrator. The heatsink may comprise or consist of copper, aluminum, silver, gold, silicon carbide, aluminum nitride, boron nitride, aluminum silicon carbide, beryllium oxide, silicon-silicon carbide, aluminum silicon carbide, copper tungsten alloys, copper molybdenum carbides, carbon, diamond, graphite, and combinations of two or more thereof. Alternatively, or additionally, the heatsink may comprise or consist of aluminum oxide. The term "heatsink" may also refer to a plurality of (different) heatsink. The light generating system may further include one or more cooling elements configured to cool the elongated luminescent body. With the present invention, cooling elements or heatsinks may be used to cool the elongated luminescent body and the same or different cooling elements or heatsinks may be used to cool the light sources. The cooling elements or heatsinks may also provide interfaces to further cooling means or allow cooling transport to dissipate the heat to the ambient. For instance, the cooling elements or heatsinks may be connected to heat pipes or a water-cooling systems that are connect to more remotely placed heatsinks or may be directly cooled by air flows such as generated by fans. Both passive and active cooling may be applied.

In specific embodiments, there is no physical contact between the heat sink (or cooling elements) and the elongated luminescent body. Especially, the average distance is at least the intensity averaged wavelength of light that is transmitted by luminescence of luminescent material. In embodiments, the average distance between the elongated luminescent body and the heatsink or cooling element is at least 1 µm, such as at least 2 µm, like at least 5 µm. Further, for a good heat transfer the average distance between the elongated luminescent body and the heatsink or cooling elements is not larger than 50 µm, such as not larger than 25 µm, like not larger than 20 µm, such as equal to or smaller than 15 µm, like at maximum 10 µm. Instead of the term "heat sink" also the term cooling element may be applied.

The term "heat dissipating element", and similar terms, herein refer to an element that dissipates the heat from the elongated luminescent body and/or of the light sources away from the elongated luminescent body and/or of the light sources. To this end, the heat dissipating element comprises especially a (highly) thermally conductive material and may comprise or may be thermally coupled to a heat sink. In general, the heat dissipating element is a passive element, that does not generate thermal energy, but guides thermal energy away from the elongated luminescent body and/or of the light sources. Instead of the term "heat dissipating element" also the term "heat transfer elements" may be applied.

In embodiments the beam shaping optical element may be integrated with the elongated luminescent body.

The light generating system may be part of or may be applied in e.g. office light generating systems, household application systems, shop light generating systems, home light generating systems, accent light generating systems, spot light generating systems, theater light generating systems, architectural lighting, fiber-optics application systems, projection systems, self-lit display systems, pixelated display systems, segmented display systems, warning sign systems, medical lighting application systems, indicator sign systems, decorative light generating systems, portable systems, automotive applications, green house light generating systems, horticulture lighting, or LCD backlighting, etc. The light generating system may also be part of or may be applied in e.g. material curing systems, additive manufacturing systems, metrology systems, UV sterilization system, (IR) imaging systems, fiber illumination systems, etc. In an aspect, the invention also provides a projection system or a luminaire comprising the light generating system as described herein, or a plurality of such light generating systems.

In a further aspect, the invention also provides a projection system, a lighting system or a luminaire comprising the light generating system as defined herein. The use of the lighting system allows to create a system or a luminaire that generates light with a high brightness and a desired etendue.

The light generating system according to the invention may be used for e.g. stage lighting, architectural lighting, or be applied in a (fluorescence) microscopy or endoscopy light generating system. Therefore, in embodiments the invention also provides a projection system, a lighting system or a luminaire comprising one or more light generating systems as defined herein. For instance, such projection systems, lighting systems or luminaires may also comprise one or more additional optical elements, like one or more of optical filters, collimators, reflectors, wavelength converters, lens elements, etc. The lighting system may be, for example, a light generating system for use in an automotive application, like a headlight or a rearlight.

The term white light herein, is known to the person skilled in the art. It especially relates to light having a correlated color temperature (CCT) between about 2000 and 20000 K, especially 2700-20000 K, for general lighting especially in the range of about 2700 K and 6500 K, and for backlighting purposes especially in the range of about 7000 K and 20000 K, and especially within about 15 SDCM (standard deviation of color matching) from the BBL (black body locus), especially within about 10 SDCM from the BBL, even more especially within about 5 SDCM from the BBL, such as within about 3 SDCM from the BBL.

The elongated luminescent body, and optionally also the beam shaping optical element, may comprise light transmissive host material (thus not taking into account the luminescent material, or more especially in embodiments a luminescent species such as trivalent cerium), especially light transparent material for one or more wavelengths in the visible, such as in the green and red, and in general also in the blue. Suitable host materials may comprise one or more materials selected from the group consisting of a transmissive organic material, such as selected from the amorphous polymers group, e.g. PC (polycarbonate), polymethylacrylate (PMA), polymethylmethacrylate (PMMA) (Plexiglas or Perspex), cellulose acetate butyrate (CAB), silicone, PDMS (polydimethylsiloxane), and COC (cyclo olefin copolymer). Especially, the light transmissive material may comprise an aromatic polyester, or a copolymer thereof, such as e.g. polycarbonate (PC), poly (methyl)methacrylate (P(M)MA), polyglycolide or polyglycolic acid (PGA), polylactic acid (PLA), polycaprolactone (PCL), polyethylene adipate (PEA), polyhydroxy alkanoate (PHA), polyhydroxy butyrate (PHB), poly(3-hydroxybutyrate-co-3-hydroxyvalerate) (PHBV), polyethylene terephthalate (PET), polybutylene terephthalate (PBT), polytrimethylene terephthalate (PTT), polyethylene naphthalate (PEN). Hence, the light transmissive material is especially a polymeric light transmissive material.

However, in another embodiment the light transmissive material may comprise an inorganic material. Especially, the inorganic light transmissive material may be selected from the group consisting of glasses, (fused) quartz, transmissive ceramic materials (such as garnets), and silicones. Glass ceramic materials may also be applied. Also, hybrid materials, comprising both inorganic and organic parts may be applied. Especially, the light transmissive material comprises one or more of PMMA, transparent PC, or glass.

When a luminescent material, like an inorganic luminescent material, quantum dots, organic molecules, etc., are embedded in a host matrix, the concentration of the luminescent material may in embodiments be selected from the range of 0.01-5 wt. % (weight %), such as 0.01-2 wt. %.

High brightness light sources may be used in e.g. front projectors, rear projectors, studio lighting, stage lighting, entertainment lighting, automotive front lighting, architectural lighting, augmented illumination (incl. data/content), microscopy, metrology, medical applications, e.g. digital pathology, etc.

Instead of $A_3B_5O_{12}$, the invention may also be applied with another cerium comprising material, such as e.g. $M_2SiO_5:Ce^{3+}$, wherein M refers to one or more elements selected from the group of lanthanides and yttrium, especially wherein M comprises one or more of Y, La, Gd, and Lu. All embodiments described herein may also be applied in relation to such luminescent material.

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily on scale.

DETAILED DESCRIPTION OF THE EMBODIMENTS

A light generating system according to the invention may be used in applications including but not being limited to a lamp, a light module, a luminaire, a spot light, a flash light, a projector, a (digital) projection device, automotive lighting such as e.g. a headlight or a taillight of a motor vehicle, arena lighting, theater lighting and architectural lighting.

Light sources which are part of the embodiments according to the invention as set forth below, may be adapted for, in operation, emitting light with a first spectral distribution. This light is subsequently coupled into a light guide or waveguide; here the elongated luminescent body. The light guide or waveguide may convert the light of the first spectral distribution to another spectral distribution and guides the light to an exit surface.

Figure 1A:
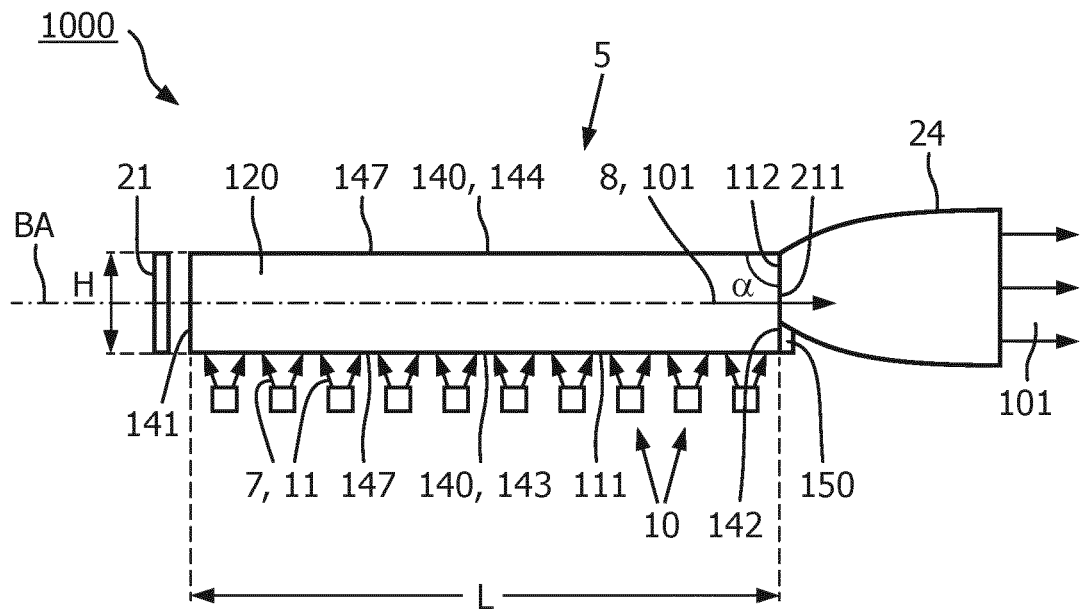
FIGS. 1A-1I schematically depict some aspects of the invention.

An embodiment of the light generating system as defined herein is schematically depicted in FIG. 1A. FIG. 1A schematically depicts a light generating system 1000 comprising a plurality of solid state light sources 10 and a luminescent concentrator 5 comprising an elongated luminescent body 100 having a first face 141 and a second face 142 defining a length L of the elongated luminescent body 100. The elongated luminescent body 100 comprising one or more radiation input faces 111, here by way of example two oppositely arranged faces, indicated with references 143 and 144 (which define e.g. the height H), which are herein also indicated as edge faces or edge sides 147. Further the elongated luminescent body 100 comprises a radiation exit window 112, wherein the second face 142 comprises the radiation exit window 112. The plurality of solid-state light sources 10 are configured to provide (blue) light source light 11 to the one or more radiation input faces 111. As indicated above, they especially are configured to provide to at least one of the radiation input faces 111 a blue power $W_{opt}$ of in average at least 0.067 Watt/mm². Reference BA indicates a body axis, which will in cuboid embodiments be substantially parallel to the edge sides 147. Reference 140 refers to side faces or edge faces in general.

The elongated luminescent body 100 may comprise a ceramic material 120 configured to wavelength convert at least part of the (blue) light source light 11 into converter light 101, such as at least one or more of green and red converter light 101. As indicated above the ceramic material 120 comprises an $A_3B_5O_{12}:Ce^{3+}$ ceramic material, wherein A comprises e.g. one or more of yttrium (Y), gadolinium (Gd) and lutetium (Lu), and wherein B comprises e.g. aluminum (Al). Reference 21 indicates a reflector. The former may reduce e.g. non-green light when green light is desired or may reduce non-red light when red light is desired. The latter may be used to reflect light back into the elongated luminescent body or waveguide, thereby improving the efficiency. Note that more reflectors than the schematically depicted reflector may be used. Note that the elongated luminescent body may also essentially consist of a single crystal, which may in embodiments also be $A_3B_5O_{12}:Ce^{3+}$.

The light sources may in principle be any type of light source, but is in an embodiment a solid state light source such as a Light Emitting Diode (LED), a Laser Diode or Organic Light Emitting Diode (OLED), a plurality of LEDs or Laser Diodes or OLEDs or an array of LEDs or Laser Diodes or OLEDs, or a combination of any of these. The LED may in principle be an LED of any color, or a combination of these, but is in an embodiment a blue light source producing light source light in the UV and/or blue color-range which is defined as a wavelength range of between 380 nm and 490 nm. In another embodiment, the light source is an UV or violet light source, i.e. emitting in a wavelength range of below 420 nm. In case of a plurality or an array of LEDs or Laser Diodes or OLEDs, the LEDs or Laser Diodes or OLEDs may in principle be LEDs or Laser Diodes or OLEDs of two or more different colors, such as, but not limited to, UV, blue, green, yellow or red.

The light sources 10 are configured to provide light source light 11, which is used as pump radiation 7. The luminescent material 120 converts the light source light into luminescent material light 8 (see also FIG. 1E). Light escaping at the radiation exit window 112 is indicated as converter light 101, and will comprise luminescent material light 8. Note that due to reabsorption part of the luminescent material light 8 within the luminescent concentrator 5 may be reabsorbed. Hence, the spectral distribution may be redshifted relative e.g. a low doped system and/or a powder of the same material. The light generating system 1000 may be used as luminescent concentrator to pump another luminescent concentrator.

Figure 1B:
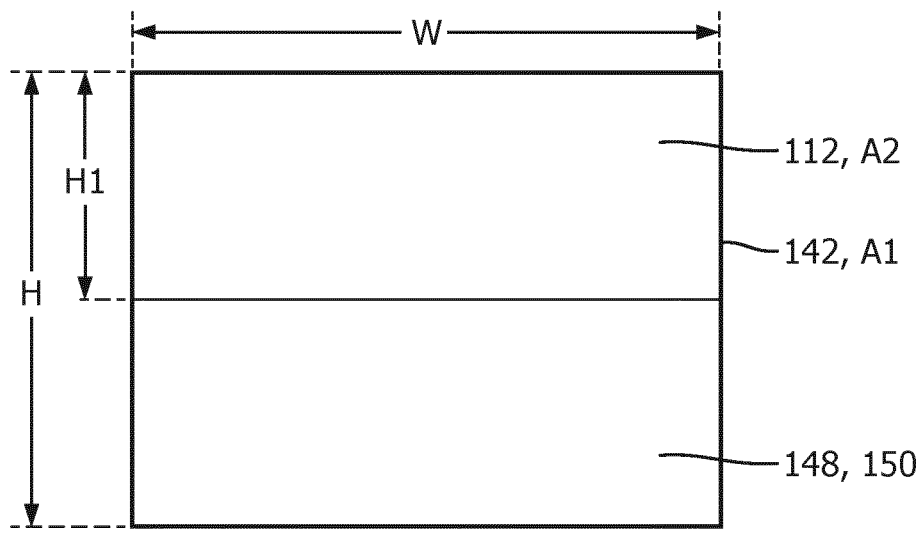
Figure 1C:
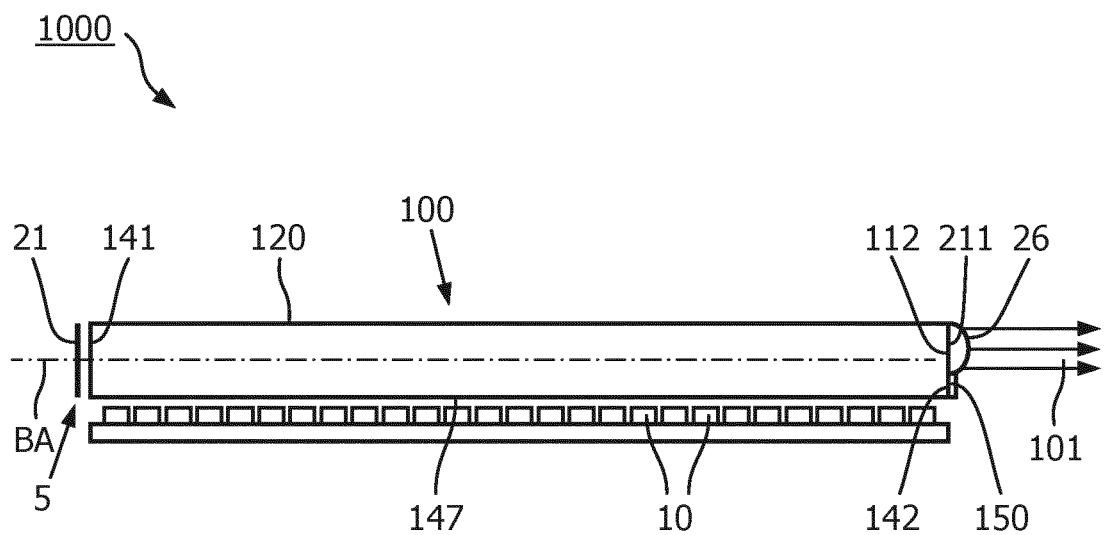

FIGS. 1A and 1C schematically depict embodiments of the light generating system 1000. The light generating system 1000 comprises a beam shaping optical element 24, 26, for example a compound parabolic light concentrating element (CPC) 24 or a truncated spherical optical element 26, both having a radiation entrance window 211. The radiation entrance window 211 of the beam shaping optical element 24, 26 is optically coupled to the first radiation exit window 112 of the elongated luminescent body 100. In alternative embodiments, the beam shaping optical element 24, 26 is a truncated pyramid element, or a dome shaped element.

Figure 1D:
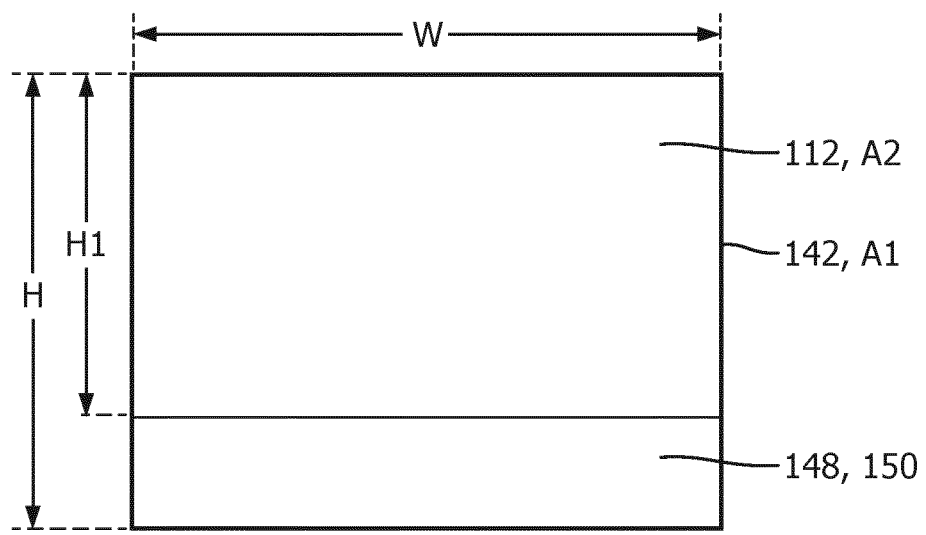

Referring to FIGS. 1B and 1D, FIG. 1B relates to the light generating system 1000 as shown in FIG. 1A and FIG. 1D related to the light generating system 1000 shown in FIG. 1C. Referring again to FIGS. 1B and 1D, the second face 142 has an second face surface area A1 and the first radiation exit window 112 has a first radiation exit window surface area A2, wherein the first radiation exit window surface area A2 is smaller than the second face surface area A1. The remaining part 148 of the second face 142 comprises a first reflecting element 150. The first reflecting element 150 may be in the form of a separate reflector or may be in the form of a reflective coating provided on part of the second face 142, amongst others. The second face 142 has a height H and a width W. The first radiation exit window 112, and hence the radiation entrance window 211, has a height H1 and a width W.

In the embodiment of the light generating system 1000 shown in FIGS. 1A and 1B, the ratio of the first radiation light exit window surface area A2 to the second face surface area A1 is equal to 0.5. In the embodiment of the light generating system 1000 shown in FIGS. 1C and 1D, this ratio is equal to 0.3. In embodiments, the ratio of the first radiation light exit window surface area A2 to the second face surface area A1 is in the range of 0.25≤A2/A1≤0.75, preferably in the range of 0.25≤A2/A1≤0.65, more preferably in the range of 0.4≤A2/A1≤0.6.

As shown in FIG. 1A and FIG. 1C, the elongated luminescent body 100 has at least two ends, and extends in an axial direction between a first base surface (also indicated as first face 141) at one of the ends of the luminescent body 100 and a second base surface (also indicated as second face 142) at another end of the luminescent body 100.

FIG. 1A and FIG. 1C also schematically depict embodiments wherein the radiation exit window 112 has an angle unequal to 0° and unequal to 180° with one or more of the one or more side faces 140. Further, the radiation input face 111 and the radiation exit window 112 may have an angle α unequal to 0° and unequal to 180° with one or more of the one or more side faces 140. Here, angle α is 90°.

Figure 1E:
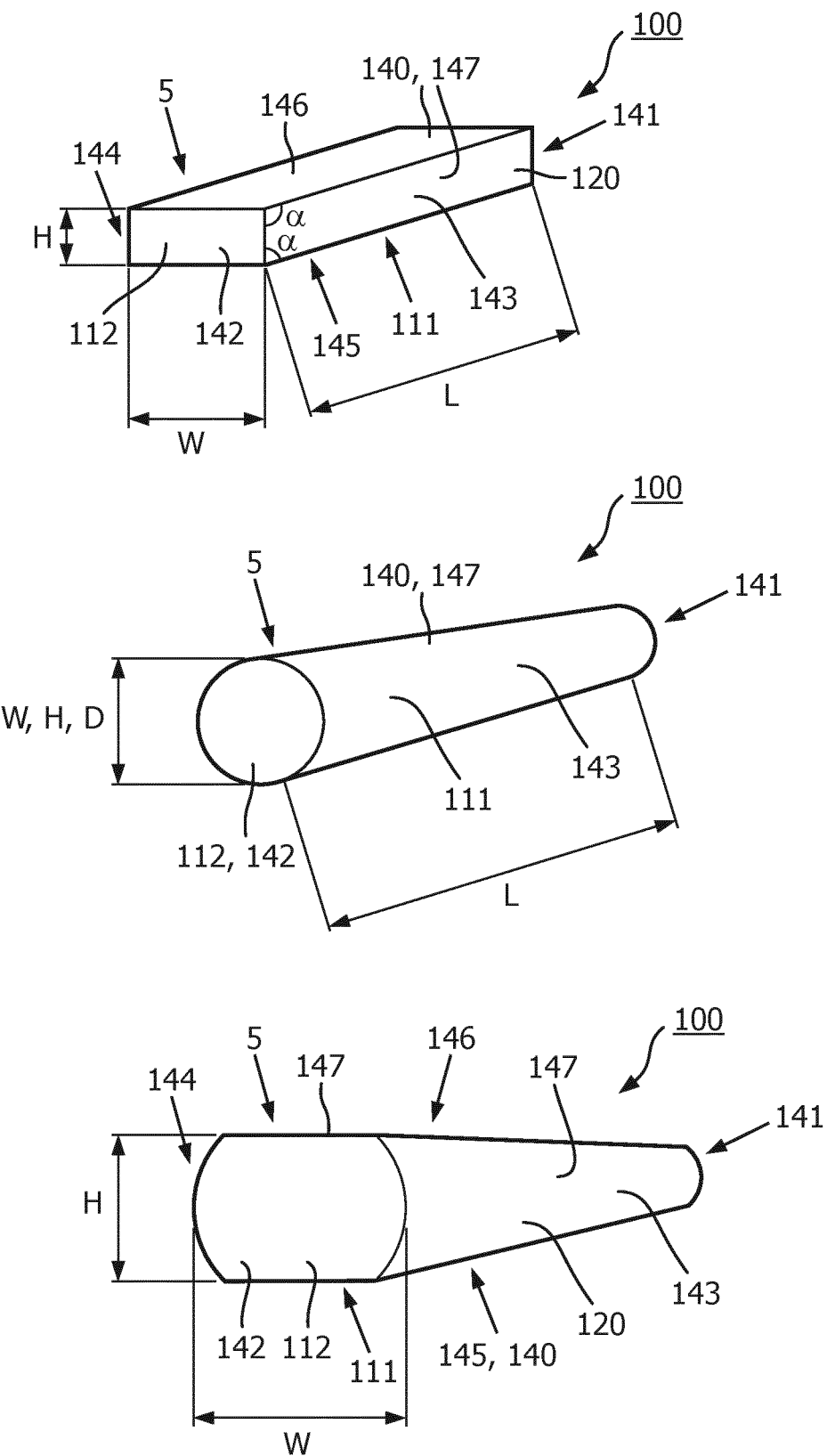

FIG. 1E schematically depicts some embodiments of possible ceramic bodies or crystals as waveguides or luminescent concentrators. The faces are indicated with references 141-146, and the edge faces in general are indicated by reference 147. The first variant, a plate-like or beam-like elongated luminescent body has the faces 141-146. Light sources, which are not shown, may be arranged at one or more of the faces 143-146. The second variant is a tubular rod, with first and second faces 141 and 142, and a circumferential face 143. Light sources, not shown, may be arranged at one or more positions around the elongated luminescent body. Such elongated luminescent body will have a (substantially) circular or round cross-section. The third variant is substantially a combination of the two former variants, with two curved and two flat side faces. In the embodiment having a circular cross-section the number of side faces may be considered unlimited (∞).

In the context of the present application, a lateral surface of the light guide should be understood as the outer surface or face of the light guide along the extension thereof. For example in case the light guide would be in form of a cylinder, with the first base surface at one of the ends of the light guide being constituted by the bottom surface of the cylinder and the second base surface at the other end of the light guide being constituted by the top surface of the cylinder, the lateral surface is the side surface of the cylinder. Herein, a lateral surface is also indicated with the term edge faces or side 140.

The variants shown in FIG. 1E are not limitative. The ceramic bodies or crystals, which are used as light guides, generally may be rod shaped or bar shaped light guides comprising a height H, a width W, and a length L extending in mutually perpendicular directions and are in embodiments transparent, or transparent and luminescent. The light is guided generally in the length L direction. The height H is in embodiments<10 mm, in other embodiments <5 mm, in yet other embodiments <2 mm. The width W is in embodiments <10 mm, in other embodiments <5 mm, in yet embodiments <2 mm. The length L is in embodiments larger than the width W and the height H, in other embodiments at least 2 times the width W or 2 times the height H, in yet other embodiments at least 3 times the width W or 3 times the height H. Hence, the aspect ratio (of length L/width W) is especially larger than 1, such as equal to or larger than 2, such as at least 5, like even more especially in the range of 10-300, such as 10-100, like 10-60, like 10-20. The term "aspect ratio" may refer to the ratio length L/width W or to the ratio height H/width W. FIG. 1A and FIG. 1C schematically depict an embodiment with four long side faces, of which e.g. one, two or four may be irradiated with light source light.

The aspect ratio of the height H/width W is typically 1:1 (for e.g. general light source applications) or 1:2, 1:3 or 1:4 (for e.g. special light source applications such as headlamps) or 4:3, 16:10, 16:9 or 256:135 (for e.g. display applications). The light guides generally comprise a light input surface and a light exit surface which are not arranged in parallel planes, and in embodiments the light input surface is perpendicular to the light exit surface. In order to achieve a high brightness, concentrated, light output, the area of light exit surface may be smaller than the area of the light input surface. The light exit surface can have any shape, but is in an embodiment shaped as a square, rectangle, round, oval, triangle, pentagon, or hexagon.

Note that in all embodiments schematically depicted herein, the radiation exit window 112 is especially configured perpendicular to the radiation input face(s) 111. Hence, in embodiments the radiation exit window and radiation input face(s) are configured perpendicular. In yet other embodiments, the radiation exit window may be configured relative to one or more radiation input faces with an angle smaller or larger than 90°.

Note that, in particular for embodiments using a laser light source to provide light source light, the radiation exit window might be configured opposite to the radiation input face(s), while the mirror 21 may consist of a mirror having a hole to allow the laser light to pass the mirror while converted light has a high probability to reflect at mirror 21. Alternatively or additionally, a mirror may comprise a dichroic mirror.

Figure 1F:
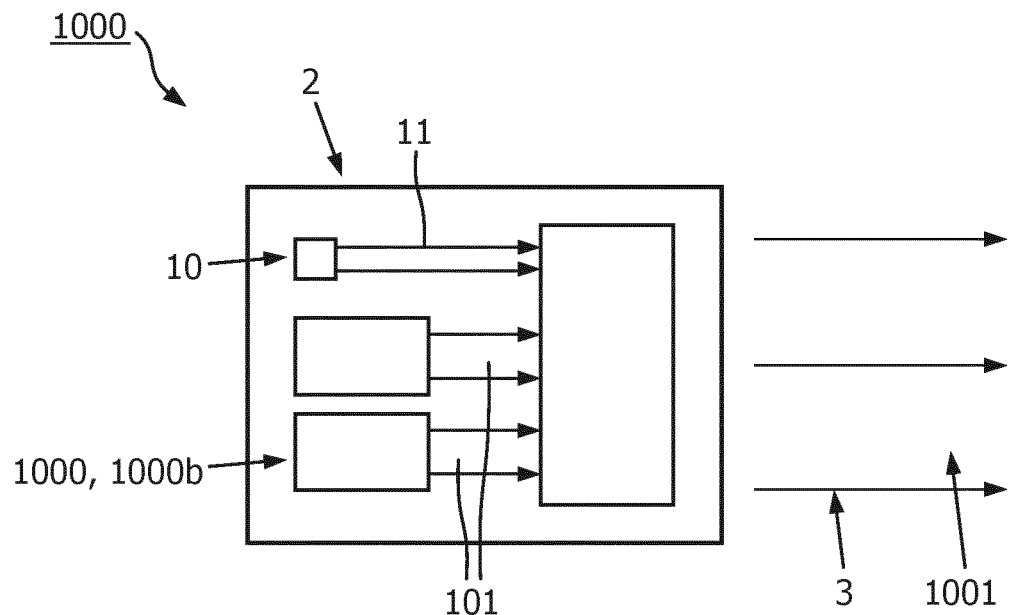

FIG. 1F very schematically depicts a projector or projection system 2 comprising the light generating system 1000 as defined herein. By way of example, here the projection system 2 comprises at least two light generating systems 1000, wherein a first light generating system 1000a is configured to provide e.g. green light 101 and wherein a second light generating system 1000b is configured to provide e.g. red light 101. Light source 10 is e.g. configured to provide blue light. These light sources may be used to provide the projection (light) 3. Note that the additional light source 10, configured to provide light source light 11, is not necessarily the same light source as used for pumping the luminescent concentrator(s). Further, here the term "light source" may also refer to a plurality of different light sources. The projection system 2 is an example of a light generating system 1000, which light generating system is especially configured to provide light generating system light 1001, which will especially include light generating system light 101.

High brightness light sources are interesting for various applications including spots, stage-lighting, headlamps and digital light projection.

Figure 1G:
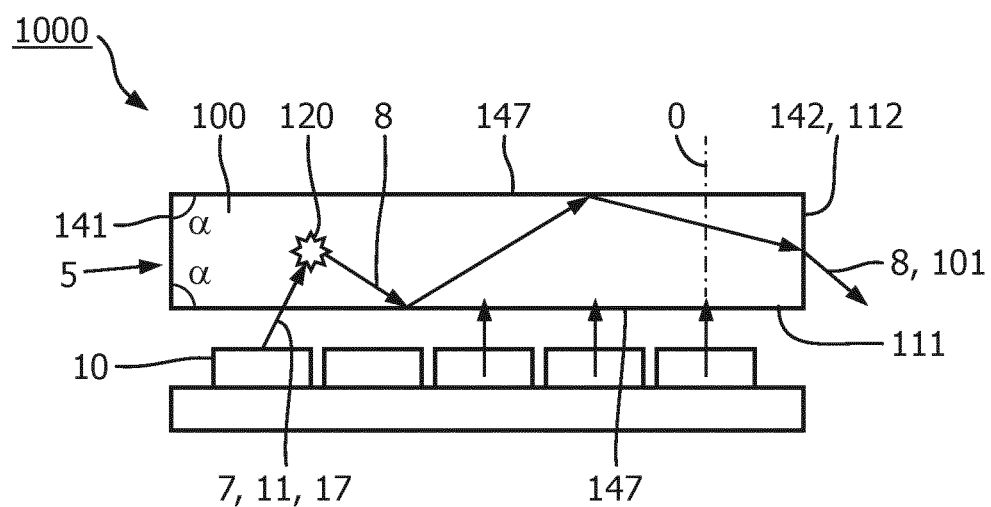

For this purpose, it is possible to make use of so-called luminescent concentrators where shorter wavelength light is converted to longer wavelengths in a highly transparent luminescent material. A rod of such a transparent luminescent material can be used and then it is illuminated by LEDs to produce longer wavelengths within the rod. Converted light which will stay in the luminescent material such as a doped garnet in the waveguide mode and can then be extracted from one of the surfaces leading to an intensity gain (FIG. 1G).

High-brightness LED-based light source for beamer applications appear to be of relevance. For instance, the high brightness may be achieved by pumping a luminescent concentrator rod by a discrete set of external blue LEDs, whereupon the phosphor that is contained in the luminescent rod subsequently converts the blue photons into green or red photons. Due to the high refractive index of the luminescent rod host material (typically ~1.8) the converted green or red photons are almost completely trapped inside the rod due to total internal reflection. At the exit facet of the rod the photons are extracted from the rod by means of some extraction optics, e.g. a compound parabolic concentrator (CPC), or a micro-refractive structure (micro-spheres or pyramidal structures). As a result, the high luminescent power that is generated inside the rod can be extracted at a relatively small exit facet, giving rise to a high source brightness, enabling (1) smaller optical projection architectures and (2) lower cost of the various components because these can be made smaller (in particular the, relatively expensive, projection display panel).

Figure 1H:
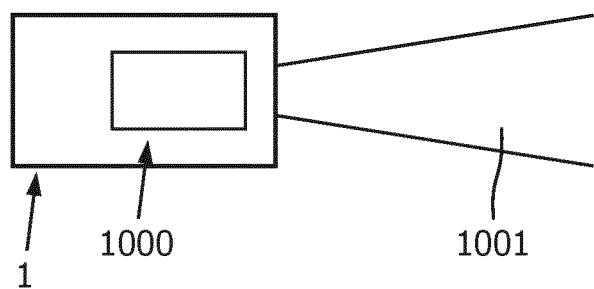

FIG. 1H schematically depicts an embodiment of a lighting system 1, or any other type of lighting device, comprising the light generating system 1000. The lighting system 1 provides light which may—in a control mode of the lighting system 1—comprise the lighting system light 1001.

Figure 1I:
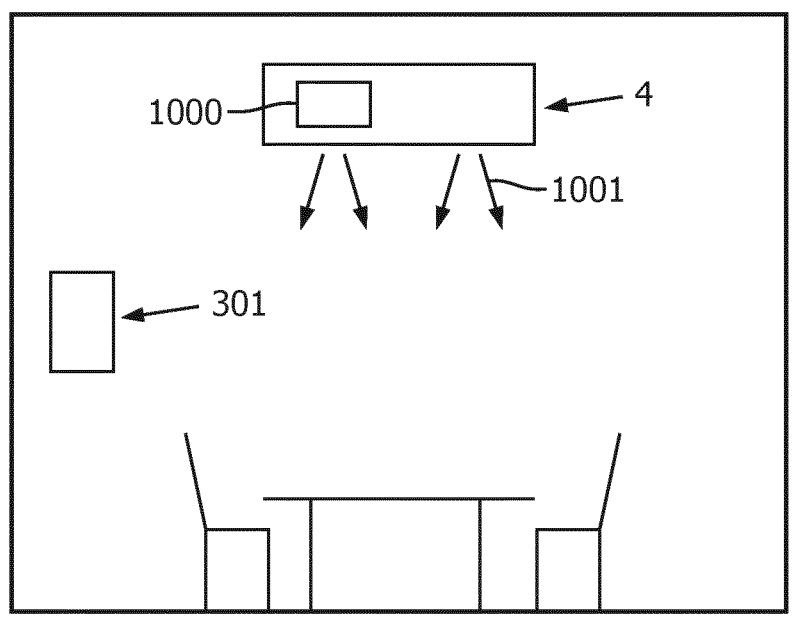

FIG. 1I schematically depicts an embodiment of a luminaire 4 comprising the light generating device 1000. Reference 301 indicates a user interface which may be functionally coupled with the control system (not depicted) comprised by or functionally coupled to the lighting system 1000. The luminaire 4 provides lighting system light 1001.

Figure 2A:
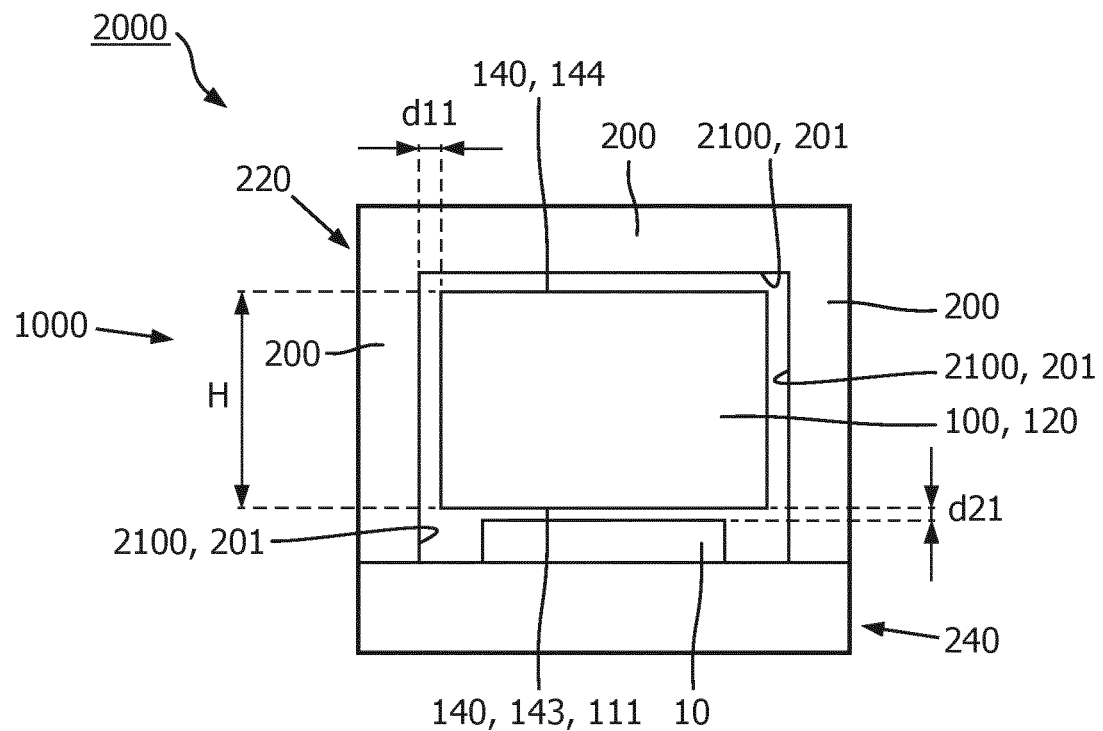
FIGS. 2A and 2B schematically shows embodiments of a light generating device according to the invention.
Figure 2B:
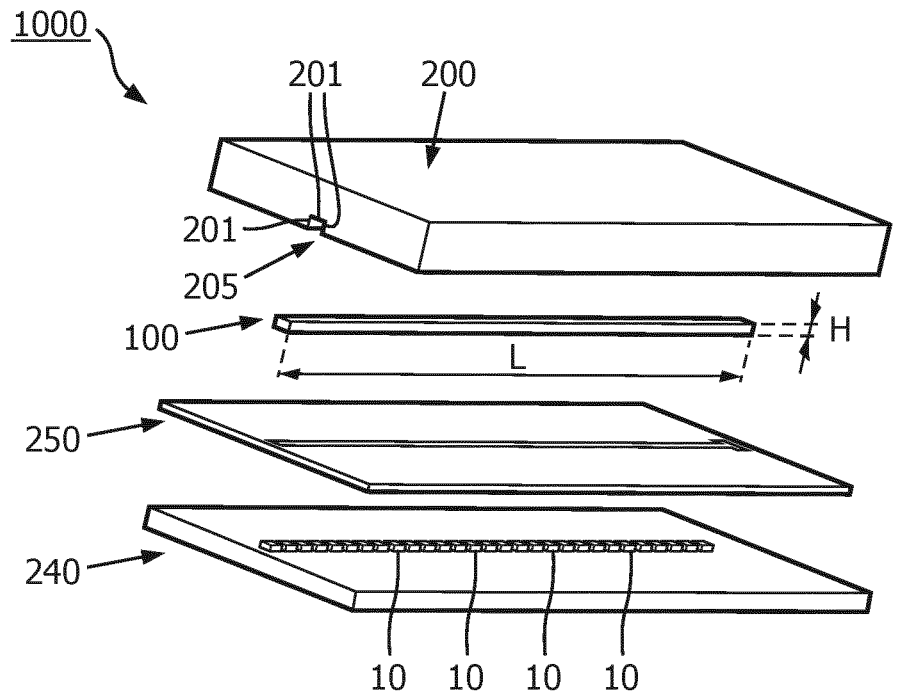

FIGS. 2A-2B schematically depict embodiments of a light generating system 1000 comprising a light source 10 configured to provide light source light 11 and an elongated luminescent body 100 having a length L (see e.g. FIG. 2C).

As indicated above, the elongated luminescent body 100 comprises (N) side faces 140, here 4, over at least part of the length. The (n) side faces 140 comprise a first side face 143, comprising a radiation input face 111, and a second side face 144 configured parallel to the first side face 143, wherein the side faces 143, 144 define a height H.

As indicated above, the elongated luminescent body 100 further comprises a radiation exit window bridging at least part of the height h between the first side face 143 and the second side face 144 (see e.g. FIG. 1A). The luminescent body 100 comprises a garnet type $A_3B_5O_{12}$ luminescent material 120 comprising trivalent cerium, wherein the garnet type $A_3B_5O_{12}$ luminescent material 120 is configured to convert at least part of the light source light 11 into converter light 101.

Further, the light generating system 1000 comprises one or more heat transfer elements 200 in thermal contact with one or more side faces 140 and a reflector 2100 configured at the second side face 144 and configured to reflect light source light 11 escaping from the elongated luminescent body 100 via second face 144 back into the elongated luminescent body 100.

The one or more heat transfer elements 200 are especially configured parallel to at least part of one or more of the side faces 140 over at least part of the length of the elongated luminescent body 100 at a shortest distance (d11) from the respective one or more side faces 140. The shortest distance d11 is especially 1 µm≤d11≤100 µm.

As shown in FIGS. 2A-2B, the one or more heat transfer elements 200 comprise one or more heat transfer element faces 201 directed to one or more side faces 140. As shown in these schematic drawings, the one or more heat transfer elements 200 are at least in thermal contact with all side faces 140 other than the first side face 143. Further, as also shown in these schematic drawings, the one or more heat transfer elements 200 may be configured as a monolithic heat transfer element 220. In embodiments, this monolithic heat transfer element 220 is configured in thermal contact with a support 240 for the light source 10. The one or more heat transfer elements 200 may especially be configured for guiding away heat from the luminescent body 100.

A heat transfer element face 201 of the one or more heat transfer element 200 directed to the second face 144 comprises the reflector 2100. Here, all faces 201 directed to the luminescent body 100 comprise such reflector 2100.

FIG. 2B schematically depict another embodiment of the monolithic heat transfer element 220, including a slit 205 configured to host the luminescent body 100. The light sources 10 may be provided as LED bar. The monolithic heat transfer element 220 is used for cooling of the luminescent body 100.

The optional intermediate plate, indicated with reference 250, may serve as a spacer to keep the luminescent body at the desired distance from the light sources and may also serve as a reflector for the light that escapes from the luminescent body side faces. As an alternative, the spacer could be integrated with the one or more heat transfer element 200, especially a top one or more heat transfer element 200 (such as a top cooling block).

In FIGS. 2A-2B, the one or more heat transfer elements are configured within a circle section of at least 180°, here in fact about 270°.

As shown above, the light generating system 1000 comprises in embodiments a plurality of light sources 10 configured to provide light source light 11 and an elongated luminescent body 100 comprising one or more side faces 140, the elongated luminescent body 100 comprising a radiation input face 111 and a radiation exit window 112, wherein the radiation input face 111 is configured in a light receiving relationship with the plurality of light sources 10, wherein the elongated luminescent body 100 comprises luminescent material 120 configured to convert at least part of light source light 11 (received at the radiation input face 111) into luminescent material light 8.

FIGS. 3A-3I show further embodiments of a light generating system 1000 according to the invention, in which reference symbols corresponding to those of FIGS. 1A and 11 indicate corresponding parts.

Figure 3A:
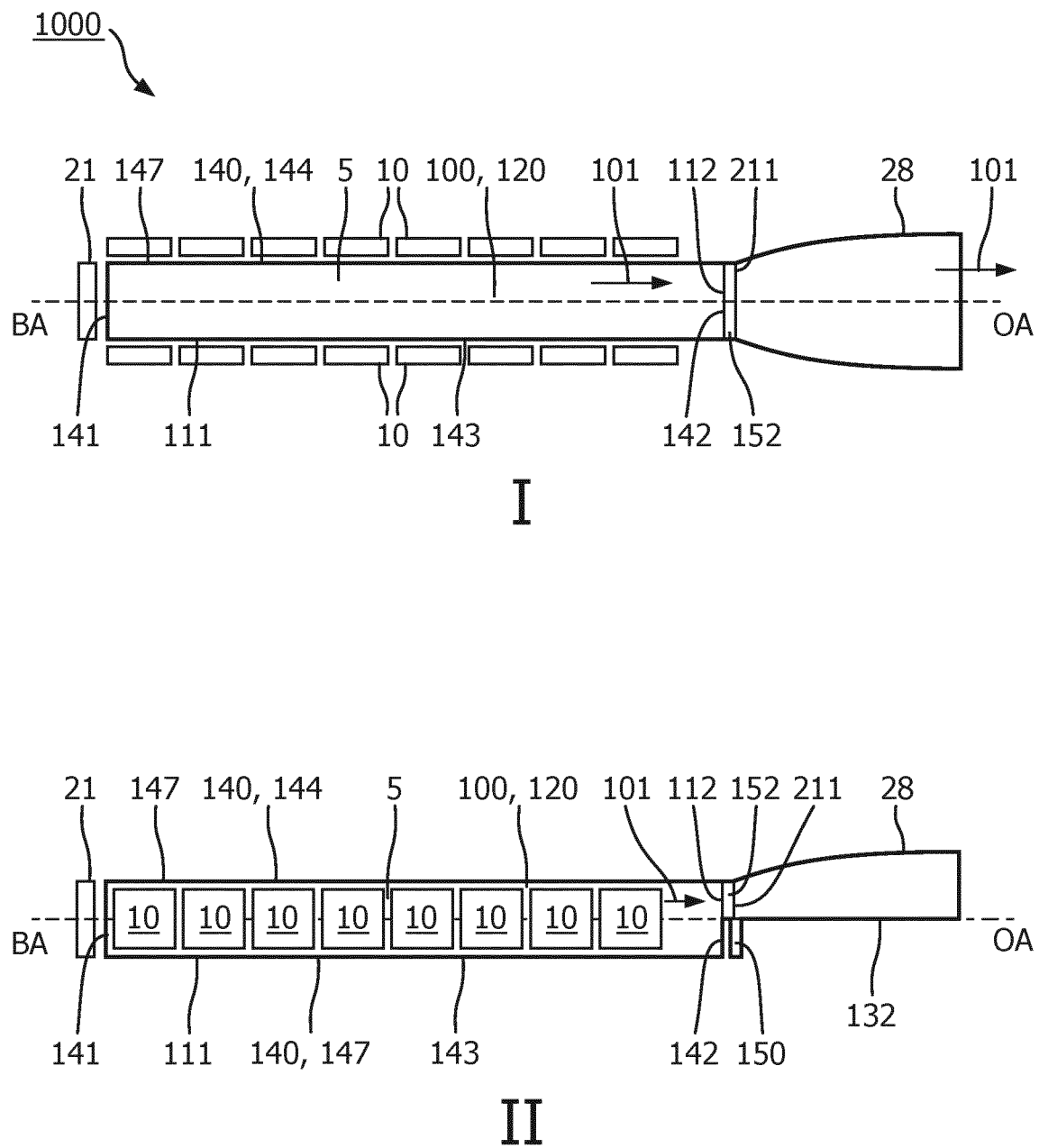
FIGS. 3A-3J schematically depict some further aspects of the invention.

FIG. 3A shows an embodiment of a light generating system 1000 comprising a beam shaping optical element 28 comprising a partial compound parabolic concentrator. The schematic drawings I and II are rotated for 90° around the body axis BA, relative to each other. The partial compound parabolic concentrator is configured as a compound parabolic concentrator that is intersected along a plane 132 coinciding with a plane of symmetry of the compound parabolic concentrator, parallel to its optical axis OA. The ratio of the first radiation exit window surface area A2 to the end surface area A1 is 0.5. Optionally, an optical element 152 is configured between the elongated luminescent body 100 and the beam shaping optical element 28. In an embodiment, the partial compound parabolic concentrator is half of a compound parabolic concentrator. In an alternative embodiment, the beam shaping optical element 28 comprises a partial truncated pyramid element, a partial truncated spherical element or a partial dome shaped element that are intersected along its plane of symmetry. Alternatively, the first radiation exit window surface area A2 of the first radiation exit window 112 is identical to the second face surface area A2 of the second face 142.

Figure 3B:
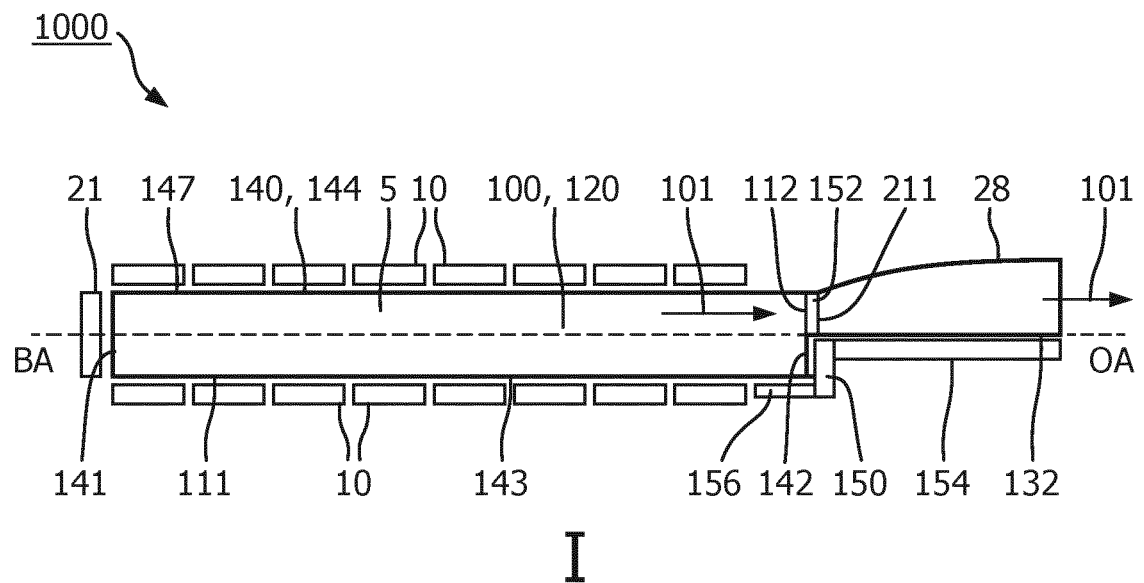
Figure 3B:
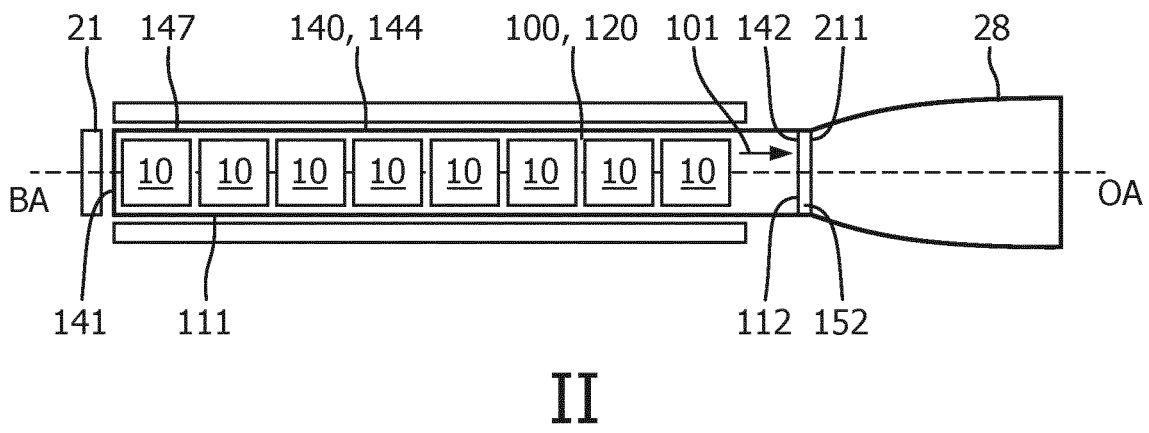

FIG. 3B shows an embodiment of a light generating system 1000 comprising, compared to the embodiment shown in FIG. 3A, a second reflecting element 154. The schematic drawings I and II are rotated for 90° around the body axis BA, relative to each other. The second reflecting element 154 is configured parallel to the plane 132. The second reflecting element 154 may be in the form of a reflector or a reflective coating provided on the plane 132. In an alternative embodiment, the first reflecting element 150 and the second reflecting element 154 are combined into a combined reflecting element. Optionally, an optical element 152 is configured between the elongated luminescent body 100 and the beam shaping optical element 28. In an alternative embodiment, second reflecting element 154 is also used for mechanical support of the beam shaping optical element 28 and/or for aligning the beam shaping optical element 28 to the elongated luminescent body 100.

Figure 3C:
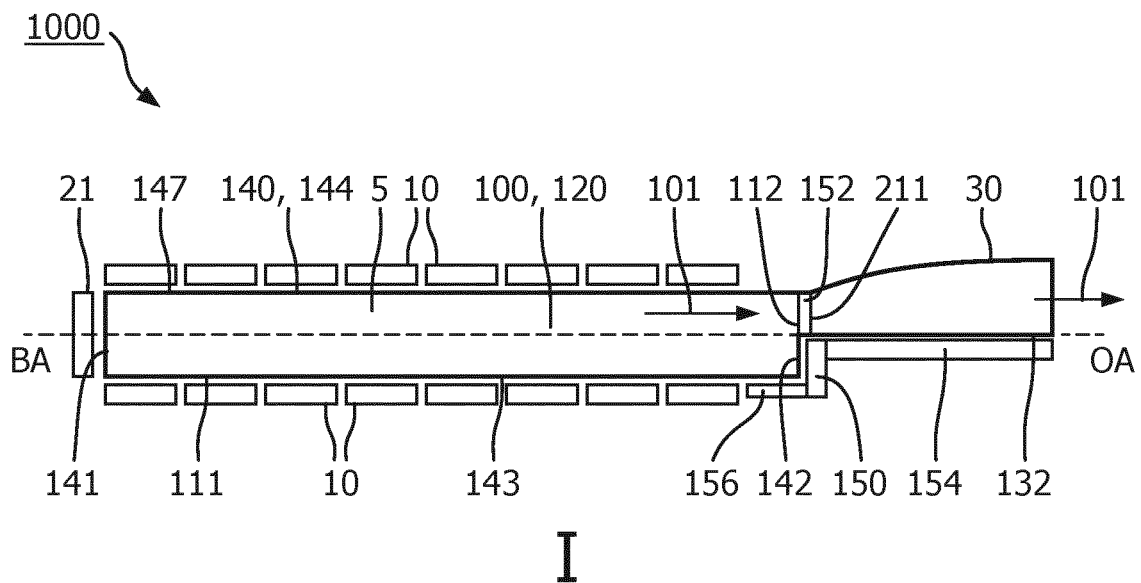
Figure 3C:
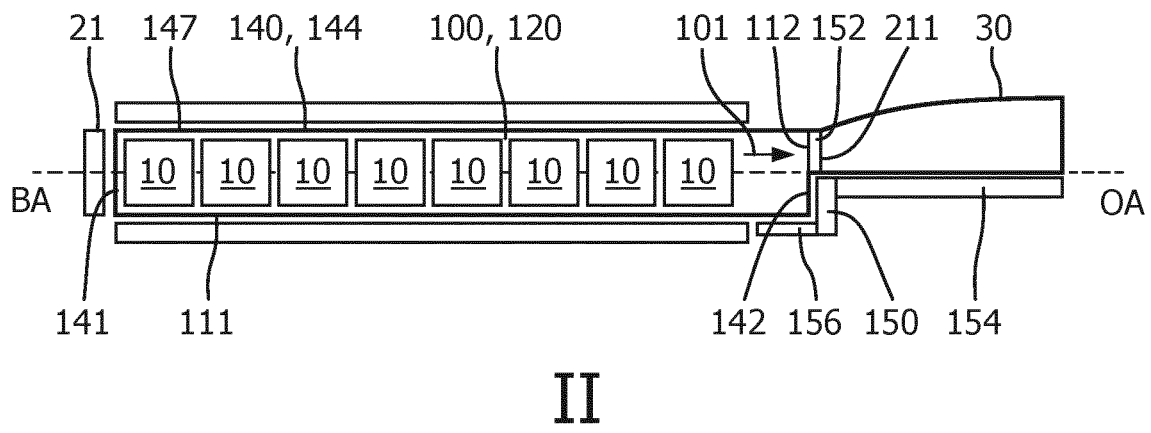

FIG. 3C shows an embodiment of a light generating system 1000 comprising a beam shaping optical component 30 comprising a quarter of a compound parabolic concentrator which may be obtained by intersecting a compound parabolic concentrator along a plane 132 intersecting with a plane of symmetry of the compound parabolic concentrator followed by intersecting each part along another plane coinciding the second plane of symmetry of that part. The two planes of intersection are positioned perpendicular relative to each other. In this way a quarter compound parabolic concentrator is obtained. The schematic drawings I and II are rotated for 90° around the body axis BA, relative to each other. Optionally, an optical element 152 is configured between the elongated luminescent body 100 and the beam shaping optical element 30.

Figure 3D:
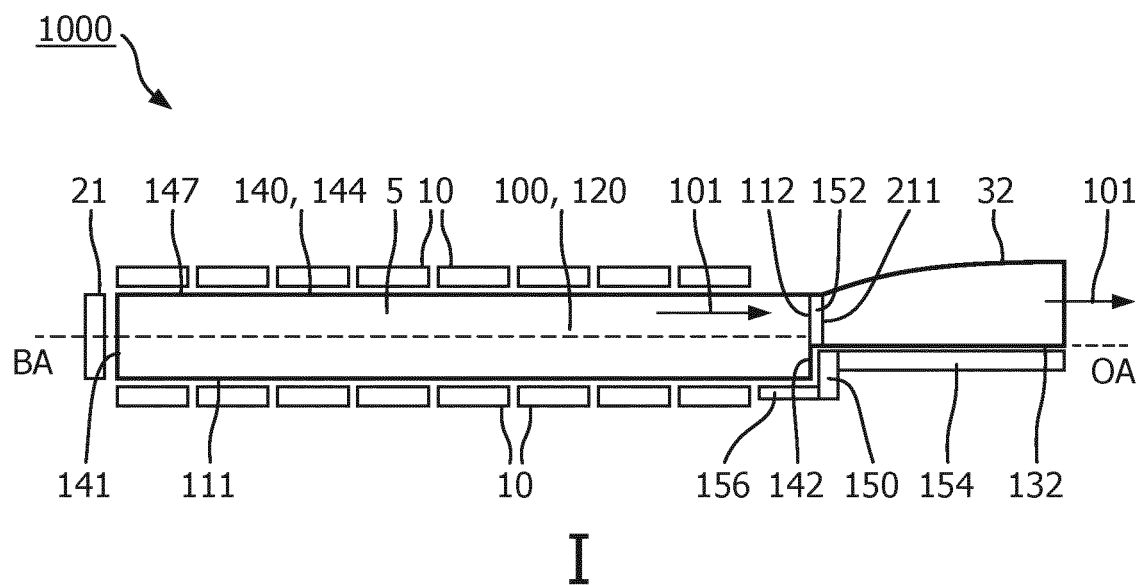
Figure 3D:
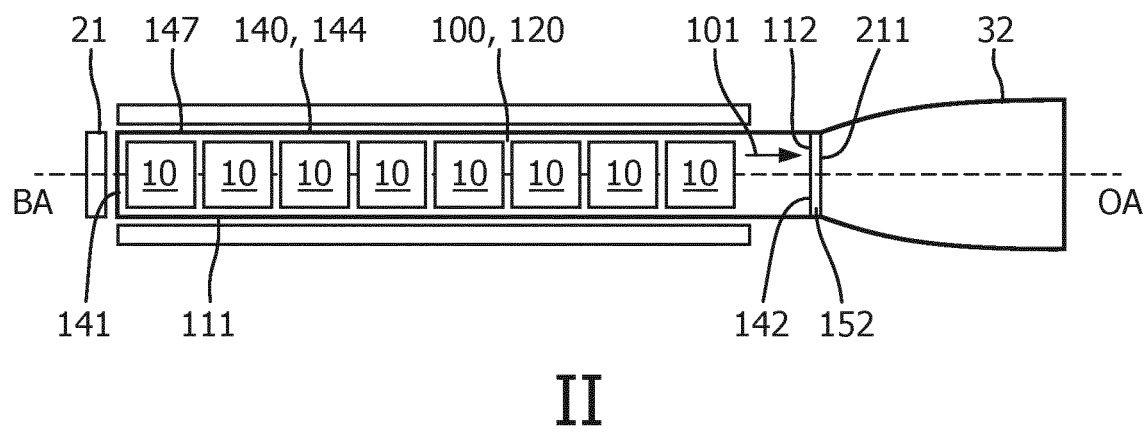

FIG. 3D shows an embodiment of a light generating system 1000 comprising a beam shaping optical element 32 comprising a half compound parabolic concentrator. The schematic drawings I and II are rotated for 90° around the body axis BA, relative to each other. The partial compound parabolic concentrator is configured as a compound parabolic concentrator that is intersected along a plane coinciding with a plane of symmetry of the compound parabolic concentrator, parallel to its optical axis OA. The ratio of the first light exit window surface area A2 and the end surface area A1 is larger than 0.5. Optionally, an optical element 152 is configured between the elongated luminescent body 100 and the beam shaping optical element 32. The beam shaping optical element 32 comprising a half compound parabolic concentrator is configured such that in case it would not be a partial compound parabolic concentrator but a full compound parabolic concentrator instead, the surface area of the radiation entrance window of the compound parabolic concentrator would be larger than the surface area of the first radiation exit window 112 of the elongated luminescent rod 100.

Figure 3E:
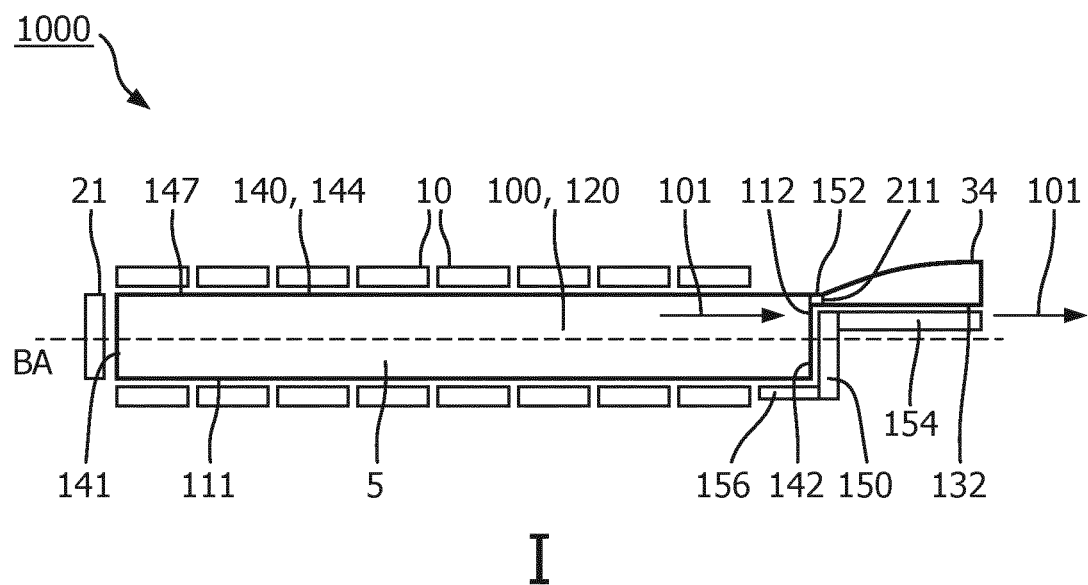
Figure 3E:
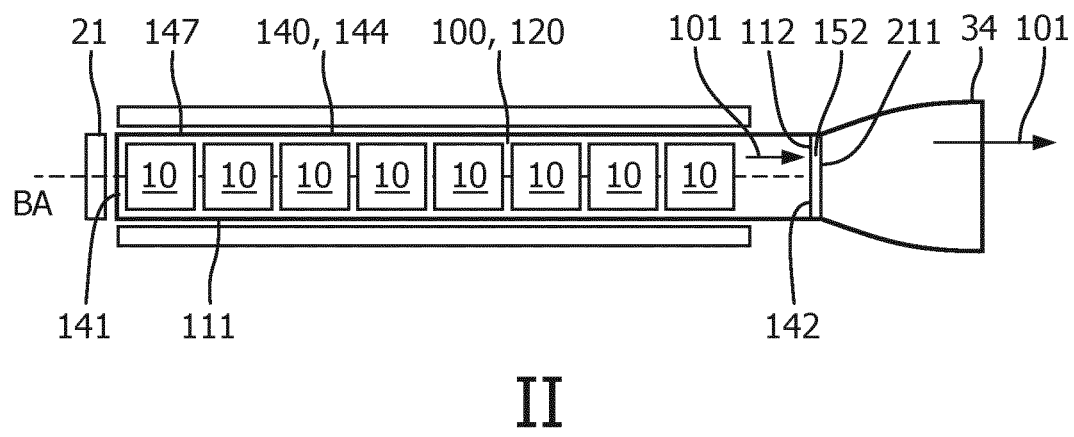

FIG. 3E shows an embodiment of a light generating system 1000 comprising a beam shaping optical element 34 comprising a half compound parabolic concentrator. The schematic drawings I and II are rotated for 90° around the body axis BA, relative to each other. The partial compound parabolic concentrator is configured as a compound parabolic concentrator that is intersected along a plane coinciding with a plane of symmetry of the compound parabolic concentrator, parallel to its optical axis OA. The ratio of the first light exit window surface area A2 and the end surface area A1 is smaller than 0.5. Optionally, an optical element 152 is configured between the elongated luminescent body 100 and the beam shaping optical element 34. The beam shaping optical element 34 comprising a half compound parabolic concentrator is configured such that in case it would not be a partial compound parabolic concentrator but a full compound parabolic concentrator instead, the surface area of the radiation entrance window of the compound parabolic concentrator would be smaller than the surface area of the first radiation exit window 112 of the elongated luminescent rod 100.

Figure 3F:
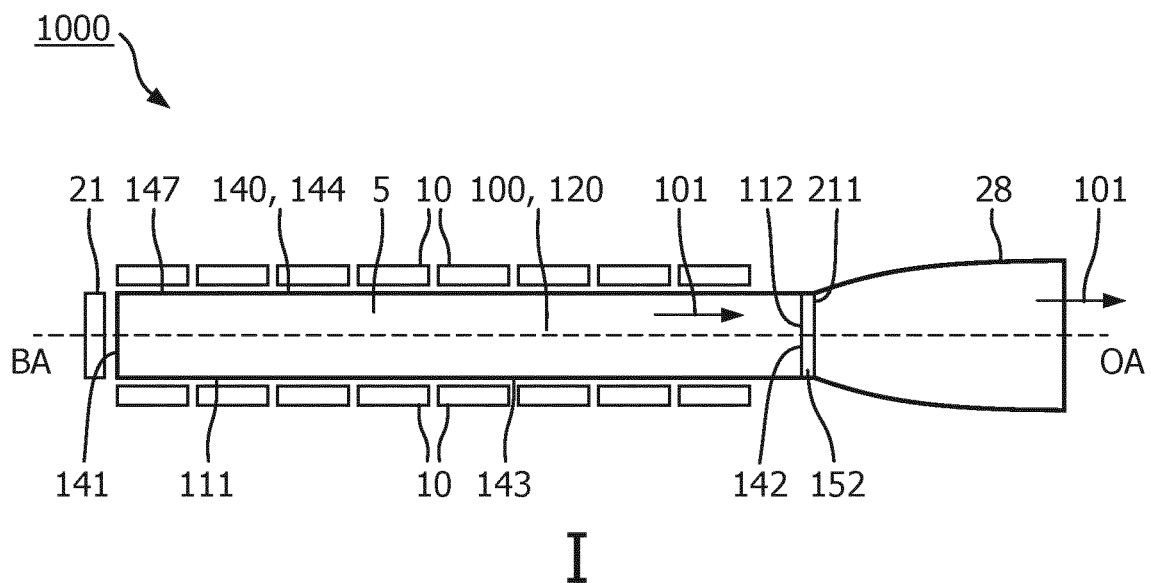
Figure 3F:
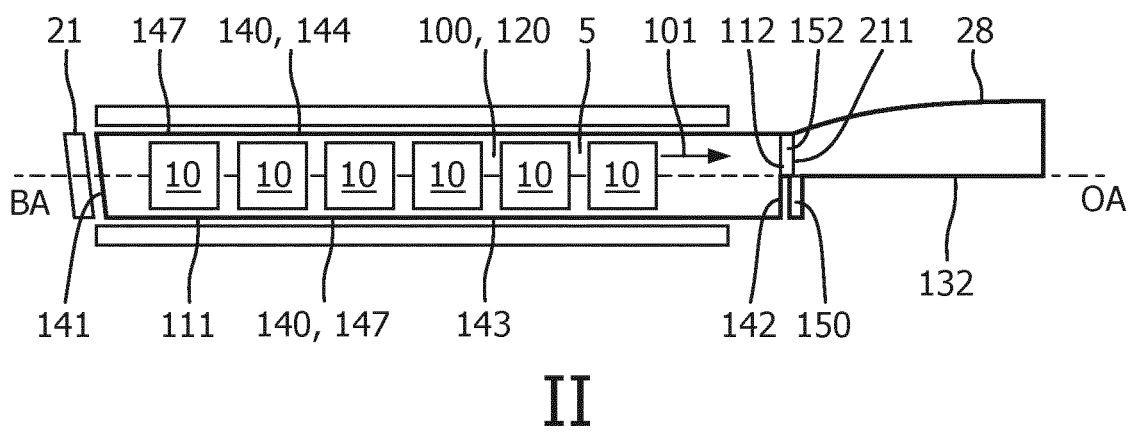

FIG. 3F shows an embodiment of a light generating system 1000 wherein, compared to the embodiment shown in FIG. 3A, the first face 141 is slanted or inclined relative to the second face 142 or alternatively worded, relative to a virtual plane perpendicular to the body axis BA. An advantage of this embodiment is that the optical efficiency of the light generating system 1000 is improved as more light is being recycled and coupled out of the elongated luminescent body 100 at the radiation exit window 112. In an alternative embodiment, the first face 141 is slanted with respect to the second face 142 in reversed order as shown in FIG. 3F. The reflector 21 may be a mirror.

Figure 3G:
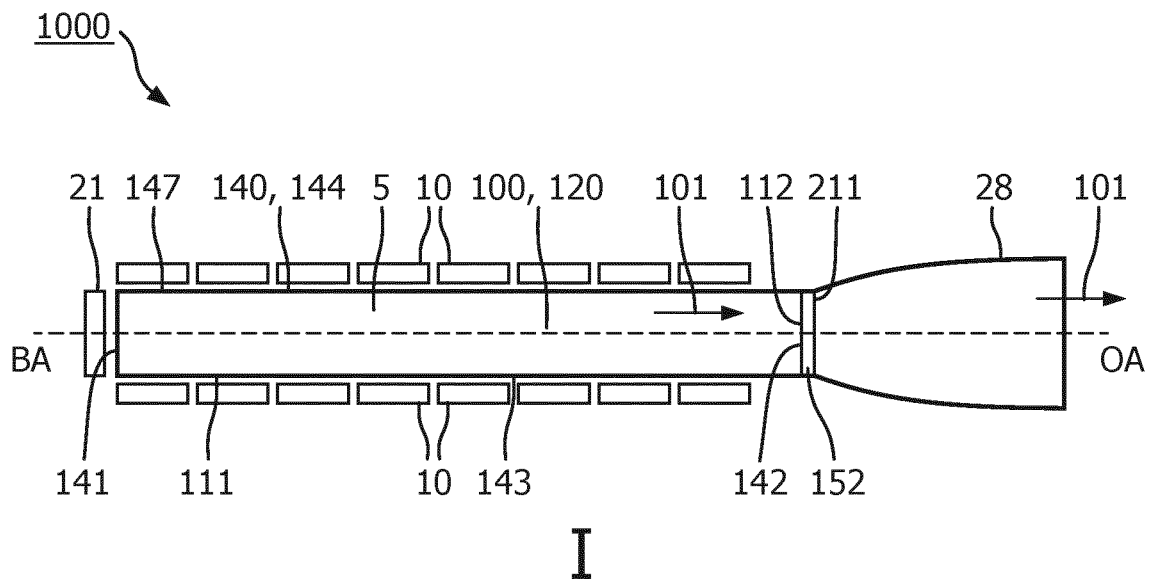
Figure 3G:
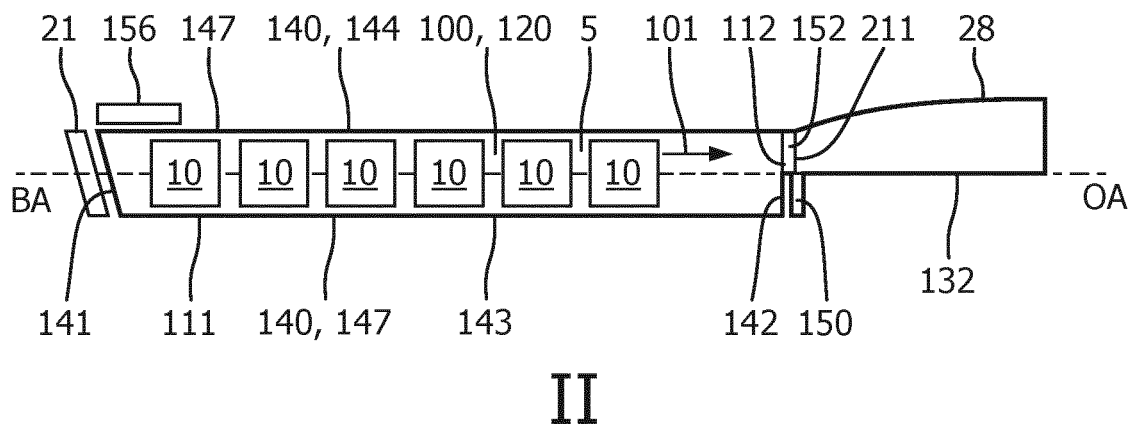

FIG. 3G shows an embodiment of a light generating system 1000 wherein, compared to the embodiment shown in FIG. 3F, a reflective element 156 is positioned along a part of one or more of the side faces 140. The reflective element 156 may also be combined with reflector 21 into a single reflective element. An advantage of this embodiment is that the optical efficiency of the light generating system 1000 is improved as more light is being recycled and coupled out of the elongated luminescent body 100 at the radiation exit window 112. In an alternative embodiment, the first face 141 is slanted with respect to the second face 142 in reversed order as shown in FIG. 3F. The reflector 21 may be a mirror.

Figure 3H:
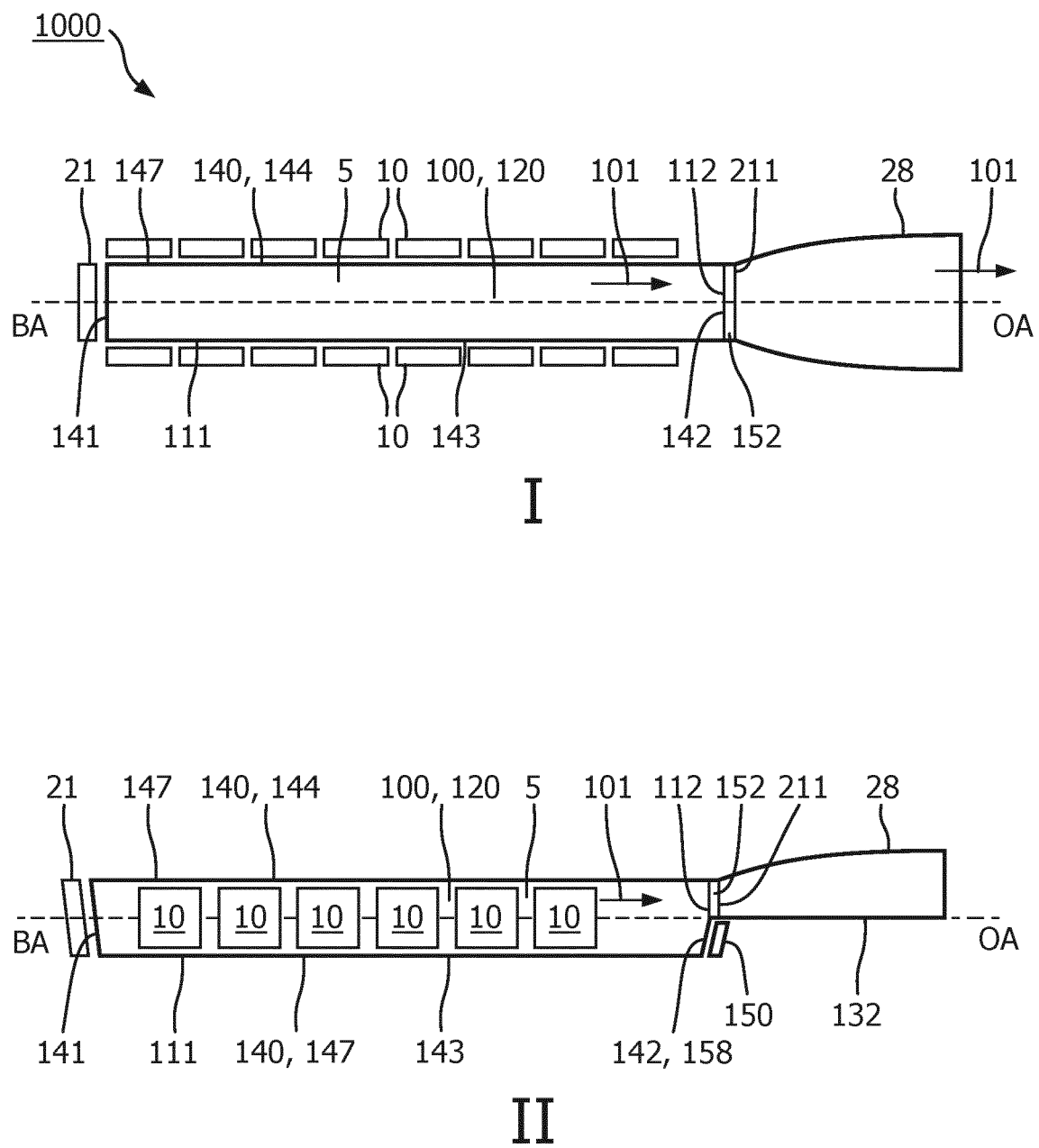

FIG. 3H shows an embodiment of a light generating system 1000 wherein, compared to the embodiment shown in FIG. 3F, the part of the second face 142, referred to by surface area 158, that is not optically coupled to the to the beam shaping optical element 28, is slanted relative to virtual plane perpendicular to the body axis BA. A reflecting element 150 is associated with the surface area 158. An advantage of this embodiment is that the optical efficiency of the light generating system 1000 is improved as more light is being recycled and coupled out of the elongated luminescent body 100 at the radiation exit window 112. The reflecting element 150 may be a mirror. In an alternative embodiment, the first face 141 and the reflector 21 are parallel to a virtual plane perpendicular to the body axis BA.

Figure 3I:
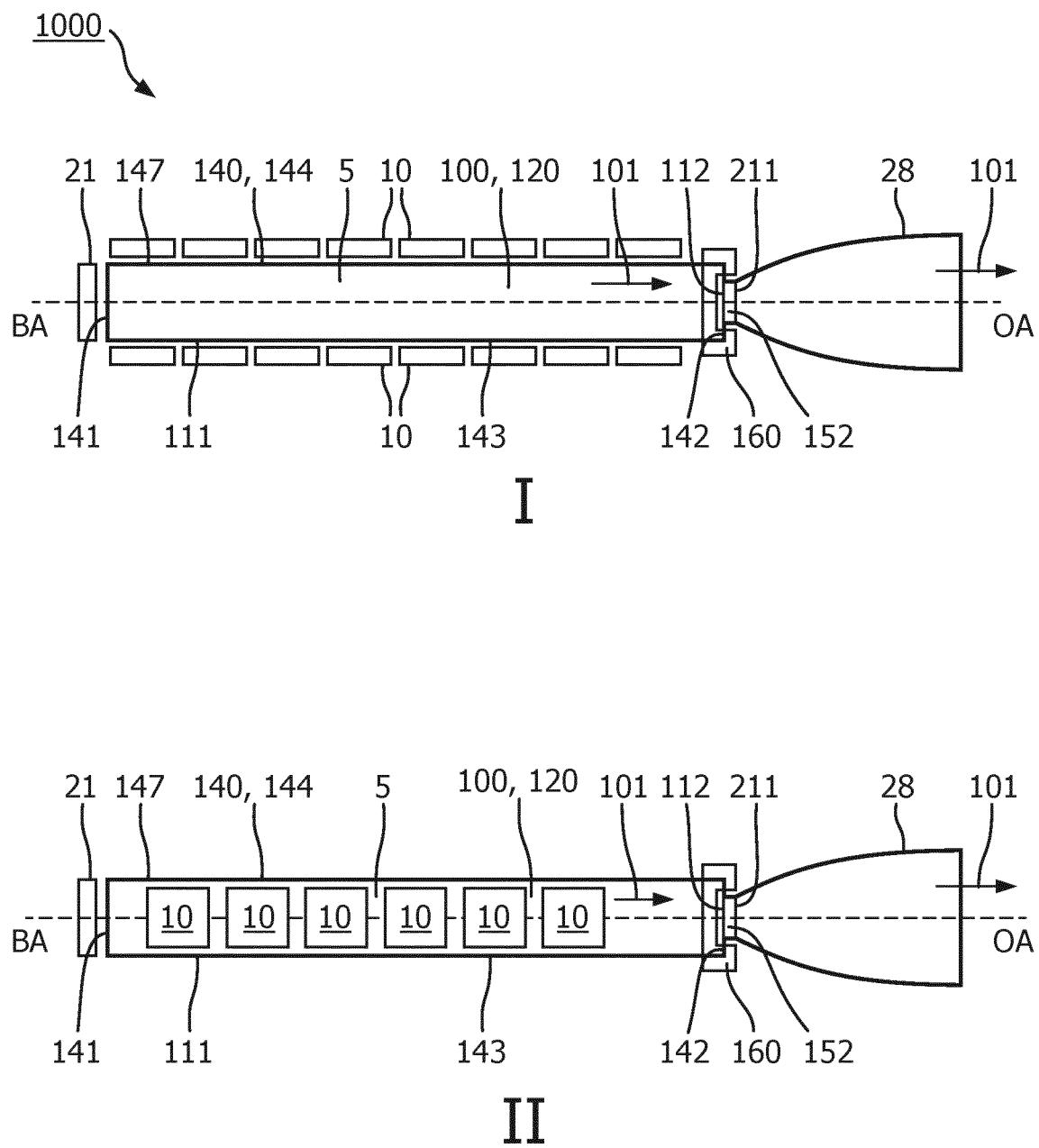

FIG. 3I shows an embodiment of a light generating system 1000 wherein, compared to the embodiment shown in FIG. 3A, a full compound parabolic concentrator 28 is positioned centrally with respect to the second face 142 and wherein the first radiation exit window 112 has a first radiation exit window surface area A2 which is smaller than the second face surface area A1. A reflecting element 160 is associated with the area of the second face 142 that is not optically coupled to the compound parabolic concentrator 28 as well with a part of one or more of the side faces 140. An advantage of this embodiment is that the optical efficiency of the light generating system 1000 is improved as more light is being recycled and coupled out of the elongated luminescent body 100 at the radiation exit window 112.

Figure 3J:
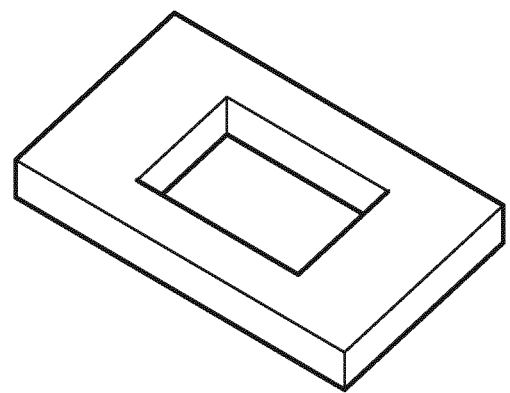
Figure 3J:
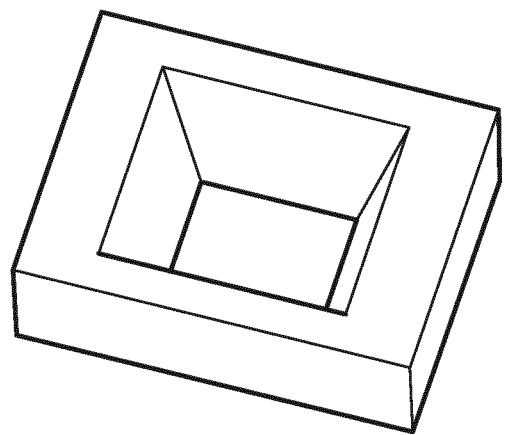
Figure 3J:
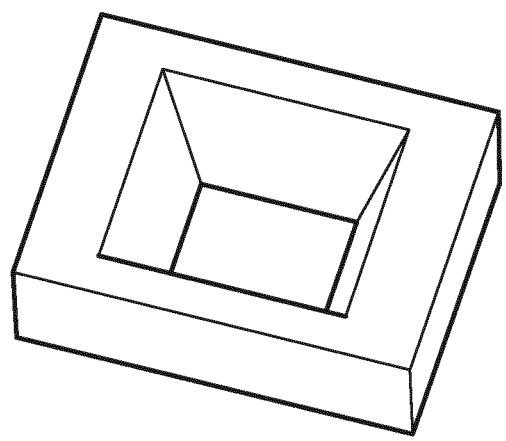

FIG. 3J shows some examples I, II and II of reflecting elements 160 as referred to in FIG. 3I.

A method of manufacturing the beam shaping optical element 28 comprising half a compound parabolic concentrator comprises the following steps. In a first step, a casting mould in the shape of half a compound parabolic concentrator is made available. In a second step, glass material is pressed into the casting mould via a side of the casting mould that is associated with the plane of intersection 132, see FIG. 3A, of the beam shaping optical element 28. In a third step, the half a compound parabolic concentrator is removed from the casting mould and is grinded or polish along the plane of intersection 132. In a similar way a quarter of a compound parabolic concentrator can be manufactured.

Optical simulations were performed and the results are shown below in Table 1 and 2. Referring to Table 1 and 2, in the first column the configuration of the light generating system is indicated. "No mirror on second face, full CPC" refers to a configuration where a compound parabolic concentrator is used with a radiation entrance window having the same size as the second face of the elongated luminescent body, as a reference. "Mirror on second face, full CPC" refers to a configuration where a elongated luminescent body has a first radiation exit window that is half of the size of the second face, and the radiation entrance window of the compounds parabolic concentrator has the same size as the first radiation exit window, as shown in FIG. 1a. The elongated luminescent body has an aspect ratio (height H/width W) of 2:1 and as a result the aspect ratio is changed to 1:1. "Mirror on second face, half CPC" refers to a configuration where a elongated luminescent body has a first radiation exit window that is half of the size of the second face, and the radiation entrance window of the compounds parabolic concentrator has the same size as the first radiation exit window. A half compound parabolic concentrator is applied, as shown in FIG. 3a. The elongated luminescent body has an aspect ratio of 2:1 and as a result the aspect ratio is changed to 1:1. In the second column of Table 1 and 2, numbers are shown for the Radiant Conversion Efficiency (RCE), that is, the optical power of the converted light that exits from the front of the (half) CPC divided by the optical power of the blue LEDs irradiating the elongated luminescent body. The third column shows the RCE relative to that of the "No mirror on second face, full CPC" configuration. The fourth column shows the RCE for the converted light within the desired étendue, or rather divergence. In these optical simulations, the compound parabolic concentrator is designed to have an output divergence of ±34°. However, there are skew rays present that have a larger angle. In column 4 of Tables 1 and 2, only the rays within ±34° are taken into account. It may depend on the application whether the light outside this intended étendue can be used or not. The fifth column lists the RCE for the converted light within the desired étendue relative to that of the "No mirror on second face, full CPC" configuration. An elongated luminescent body with an exit face of 2×1 mm and a length of 52 mm was assumed, implying that the étendue is 14.5 mm² sr for the "No mirror on second face, full CPC" configuration and 7.25 mm² sr for the other two configurations that have a mirror on the second face of the elongated luminescent body. Simulations were performed for two different values of the refractive index, and the compounds parabolic concentrator and the elongated luminescent body having an identical refractive index.

TABLE 1

Radiant Conversion Efficiency (RCE), relative RCE, RCE in intended étendue and relative RCE in intended étendue, for a luminescent rod of aspect ratio (height H/width W) 2:1. The second and third configuration have a mirror that covers half of the exit of the luminescent rod resulting in an aspect ratio of 1:1. The CPC and elongated luminescent body both have a refractive index n = 1.52.

| Configuration | RCE | relative RCE | RCE in étendue | relative RCE in étendue |
| --- | --- | --- | --- | --- |
| No mirror on second face, full CPC | 0.279 | 100% | 0.259 | 100% |
| Mirror on second face, full CPC | 0.254 | 91% | 0.228 | 88% |
| Mirror on second face, half CPC | 0.245 | 88% | 0.226 | 87% |

TABLE 2

Radiant Conversion Efficiency (RCE), relative RCE, RCE in intended étendue and relative RCE in intended étendue, for a luminescent rod of aspect ratio (height H/width W) 2:1. The second and third configuration have a mirror that covers half of the exit of the luminescent rod resulting in an aspect ratio of 1:1. The CPC and elongated luminescent body both have a refractive index n = 1.83.

| Configuration | RCE | relative RCE | RCE in étendue | relative RCE in étendue |
|---|---|---|---|---|
| No mirror on second face, full CPC | 0.350 | 100% | 0.322 | 100% |
| Mirror on second face, full CPC | 0.303 | 87% | 0.270 | 84% |
| Mirror on second face, half CPC | 0.305 | 87% | 0.281 | 87% |

The results of the optical simulations shown in Table 1 and 2 show that the use of a light generating system according to the invention results in a relatively high optical efficiency while allowing to change the aspect ratio of the light beam generated by the system.

Further optical simulations were performed on a light generating system and the results are shown below in Table 3. Referring to Table 3, in the first column the refractive index of the material of the CPC is shown. In the second, third and fourth columns the numbers are shown for the Radiant Conversion Efficiency (RCE), that is, the optical power of the converted light that exits from the system by the optical power of the blue LEDs irradiating the elongated luminescent body. In second column "RCE total" refers to the RCE of the light as output from the elongated luminescent body itself. In the third column "RCE-CPC all" refers to the RCE of the total amount of light as output from the CPC. In the fourth column "RCE-CPC in etendue" refers to the RCE of the light output of the CPC within a desired etendue. In all cases of Table 3 the entrance window surface area of the CPC is half of the exit window of the elongated luminescent body. The elongated luminescent body has an aspect ratio of 2:1 and the aspect ratio is not changed by the combination of the elongated luminescent body and the CPC.

TABLE 3

Relative Radiant Conversion Efficiency (RCE), for an elongated luminescent body with an aspect ratio (height H/width W) 2:1 and a refractive index of 1.83 in combination with a CPC with varying refractive index.

| Refractive index of CPC | RCE total [%] | RCE-CPC all | RCE-CPC in etendue |
|---|---|---|---|
| 1.40 | 86.8 | 86.9 | 86.7 |
| 1.52 | 87.1 | 87.0 | 86.8 |
| 1.70 | 87.2 | 87.0 | 86.7 |
| 1.83 | 86.6 | 86.5 | 86.2 |
| 2.00 | 86.7 | 86.6 | 86.2 |

The results of the optical simulations shown in Table 3 show that the optical efficiency (RCE) is basically independent from the refractive index from the material of the CPC. Similar results were obtained in optical simulations where the aspect ratio was changed from 2:1 to 1:1 by the CPC.

Figure 4:
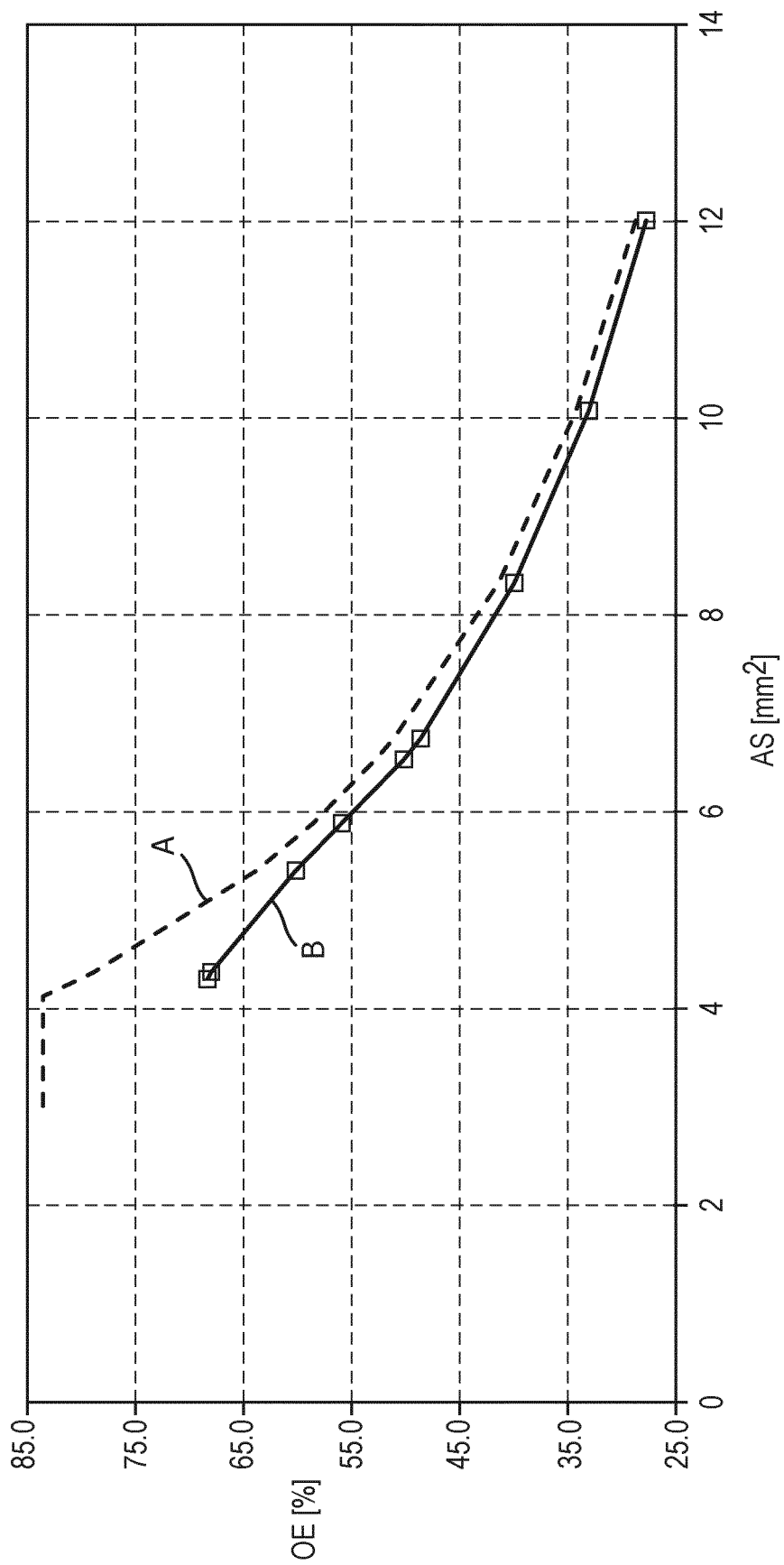
FIG. 4 schematically depict results of optical simulations.

FIG. 4 shows the results of simulations performed on the use of a compound parabolic concentrator as a beam shaping optical element in combination with a light emitting diode (LED), as a light source for a liquid crystal display (LCD) panel, for varying surface area of the LED die. It is assumed that (i) the dimension of the LCD display is 0.64 inch and has an aspect ratio of 1.29, (ii) the brightness of the LED is constant at varying surface area of the LED die, (iii) the radiation entrance surface of the compound parabolic concentrator is 4.16 mm$^2$ and (iv) an overfill of 0.5 mm for the edges of the LCD display panel. In FIG. 4 on the vertical axis the optical efficiency (OE) in % is shown versus the surface area of the LED die (AS) in mm$^2$ on the horizontal axis. The optical efficiency is defined as the absolute ray efficiency. Given the chosen overfill of 0.5 mm, the maximum theoretical optical efficiency is limited to 85%. At varying surface area of the LED die, the combination of an LED with the compound parabolic concentrator results in the desired aspect ratio and etendue. Curve A in FIG. 4 shows the optical efficiency for a beam shaping optical element without optical losses. Curve B shows the optical efficiency for a compound parabolic concentrator as a beam shaping optical element. FIG. 4 shows that the use of a compound parabolic concentrator as a beam shaping optical element for achieving a desired etendue and/or aspect ratio provides a relatively high optical efficiency.

The term "plurality" refers to two or more.

The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%.

The term "comprise" includes also embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A light generating system comprising:
   a plurality of light sources configured to provide light source light;
   an elongated luminescent body having a first face and a second face defining a length of the elongated luminescent body, the elongated luminescent body comprising one or more side faces, the elongated luminescent body comprising a radiation input face and the second face comprising a first radiation exit window, wherein the radiation input face is configured in a light receiving relationship with the plurality of light sources, wherein the elongated luminescent body comprises luminescent material configured to convert at least part of the light source light into luminescent material light, wherein the second face has an angle unequal to 0° and unequal to 180° with the radiation input face, and wherein the second face has a second face surface area;
   a beam shaping optical element comprising a radiation entrance window optically coupled with the first radiation exit window and configured to receive at least part of the converter light, wherein the first radiation exit window has a first radiation exit window surface area which is smaller than the second face surface area, and wherein the second face surface area that is not optically coupled to the beam shaping optical element comprises a first reflecting element, wherein the beam shaping optical element comprises a partial beam shaping optical element configured as a beam shaping optical element intersected along a plane parallel to a plane of symmetry of the beam shaping optical element.

2. The light generating system according to claim 1, wherein the first radiation exit window is asymmetrically positioned with respect to the second face.

3. The light generating system according to claim 2, wherein the elongated luminescent body has a refractive index n1, wherein the beamshaping optical element has a refractive index n2, and wherein $0.75*n1 \leq n2 \leq 1.1*n1$.

4. The light generating system according to claim 1, wherein the beam shaping optical element comprises at least one of a compound parabolic concentrator, a truncated pyramid element, a truncated spherical element and a dome shaped element.

5. The light generating system according to claim 1, wherein the beam shaping optical element comprises a partial beam shaping optical element configured as a beam shaping optical element intersected along a plane coinciding with a plane of symmetry of the beam shaping optical element.

6. The light generating system according to claim 4, wherein the second face has a first aspect ratio R1 and the radiation entrance window has a second aspect ratio R2 and wherein $R2 \leq 0.9*R1$.

7. The light generating system according to claim 5, wherein the partial beam shaping optical element is half of a compound parabolic concentrator.

8. The light generating system according to claim 5, wherein the partial beam shaping optical element comprises a quarter of a compound parabolic concentrator.

9. The light generating system according to claim 6, wherein the partial beam shaping optical element is quarter of a compound parabolic concentrator.

10. The light generating system according to claim 6, wherein the partial beam shaping optical element further comprises a second reflecting element associated with the plane of intersection.

11. The light generating system according to claim 10, further comprising a reflector, wherein the reflector comprises the first reflecting element and the second reflecting element.

12. The light generating system according to claim 1, further comprising an optical element, wherein the beam shaping optical element is optically coupled with the first radiation exit window via the optical element.

13. The light generating system according to claim 11, wherein the optical element having a refractive index n3, and wherein $0.95*n2 \leq n3 \leq 1.05*n1$.

14. The light generating system according to claim 1, wherein the ratio of the first radiation exit window surface area to the second face surface area is in the range of $0.2 \leq A2/A1 \leq 0.95$.

15. A projection system, a lighting system or a luminaire comprising the light generating system according to claim 1.

* * * * *